(12) United States Patent
Hosogane et al.

(10) Patent No.: US 6,549,480 B2
(45) Date of Patent: Apr. 15, 2003

(54) SEMICONDUCTOR INTEGRATED CIRCUIT ALLOWING INTERNAL VOLTAGE TO BE MEASURED AND CONTROLLED EXTERNALLY

(75) Inventors: Akira Hosogane, Hyogo (JP); Yoshitsugu Dohi, Hyogo (JP); Hiroaki Nakai, Hyogo (JP); Tatsuya Saeki, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 108 days.

(21) Appl. No.: 09/774,719

(22) Filed: Feb. 1, 2001

(65) Prior Publication Data

US 2002/0024330 A1 Feb. 28, 2002

(30) Foreign Application Priority Data

Aug. 25, 2000 (JP) ........................................ 2000-255545

(51) Int. Cl.[7] ................................................ G11C 7/00
(52) U.S. Cl. .............. 365/226; 365/189.05; 365/189.09
(58) Field of Search .......................... 365/226, 230.06, 365/189.05, 189.09; 323/317

(56) References Cited

U.S. PATENT DOCUMENTS

| 5,426,616 | A | * | 6/1995 | Kajigaya et al. ............. 365/226 |
| 5,557,571 | A | * | 9/1996 | Kato ...................... 365/189.05 |
| 5,942,808 | A | * | 8/1999 | Kaneko et al. ................. 307/18 |
| 6,339,357 | B1 | * | 1/2002 | Yamasaki et al. ............ 327/538 |

FOREIGN PATENT DOCUMENTS

| JP | 7-20209 | 1/1995 |
| JP | 11-73800 | 3/1999 |
| JP | 2000-48600 | 2/2000 |

* cited by examiner

*Primary Examiner*—Michael S. Lebentritt
*Assistant Examiner*—Jung H. Hur
(74) *Attorney, Agent, or Firm*—McDermott, Will & Emery

(57) ABSTRACT

An internal voltage from an internal voltage generating circuit is transmitted to a pad in accordance with a control signal, and a buffer circuit coupled to the pad is set in an inactive state. The pad is connected to an external pin terminal via a bonding wire. Consequently, a semiconductor integrated circuit capable of monitoring and forcedly setting an internal voltage from an outside of the circuit device is realized with a minimum number of pin terminals without increasing the number of external pin terminals.

26 Claims, 18 Drawing Sheets

F I G. 2 7  PRIOR ART
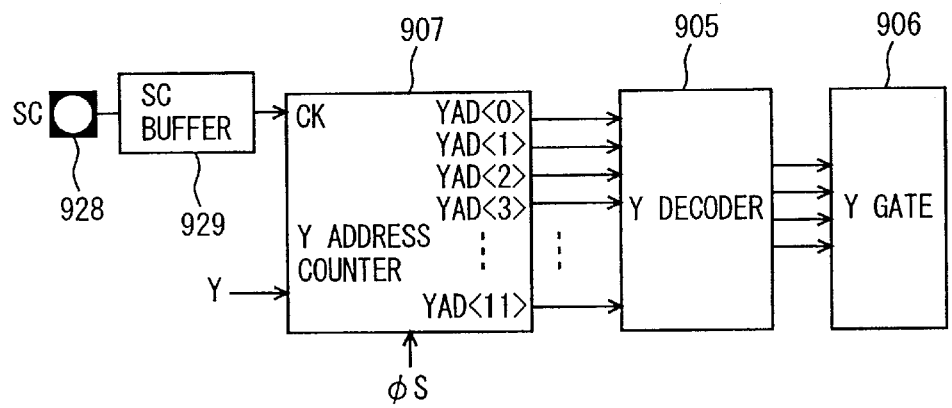
F I G. 2 8  PRIOR ART
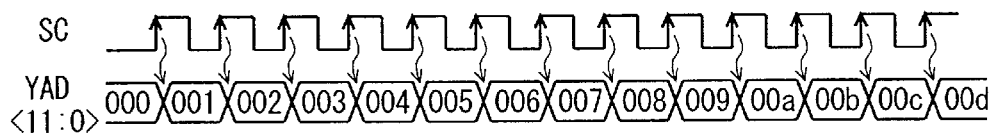
F I G. 2 9  PRIOR ART
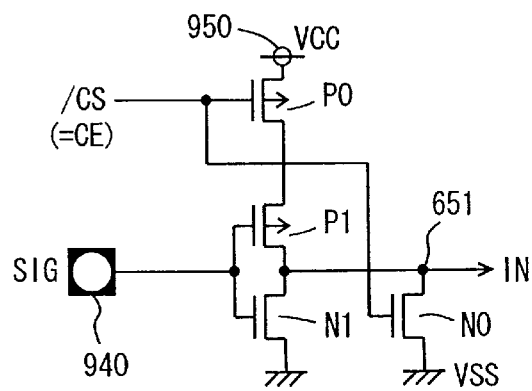

US 6,549,480 B2

SEMICONDUCTOR INTEGRATED CIRCUIT ALLOWING INTERNAL VOLTAGE TO BE MEASURED AND CONTROLLED EXTERNALLY

BACKGROUND OF THE INVENTION

1. Field of the Invention

The present invention relates to a semiconductor integrated circuit and, more particularly, to a configuration for measuring an internal voltage generated internal to a semiconductor integrated circuit and for applying externally a voltage for estimation. More particularly, the invention relates to a configuration for estimating an internal voltage in a semiconductor memory device.

2. Description of the Background Art

In a semiconductor integrated circuit, a voltage at a desired voltage level is generated for reduction in number of pins, reduction in power consumption of a whole system, and others.

FIG. 23 is a diagram schematically showing the whole configuration of a nonvolatile semiconductor memory device as an example of such a semiconductor integrated circuit. In FIG. 23, a nonvolatile semiconductor memory device 900 includes: a memory array 901 having a plurality of nonvolatile memory cells arranged in rows and columns; an X decoder 902 for selecting a row in the memory array 901; a data register 903 for holding data of nonvolatile memory cells in one row in the memory array 901; an X address buffer 904 for buffering a received X address signal and supplying the buffered signal to the X decoder 902; a Y decoder 905 for decoding a received Y address signal and generating a column selection signal; and a Y gate 906 for selecting a register circuit included in the data register 903 in accordance with the column selection signal from the Y decoder 905.

In the data register 903, the register circuits are provided in correspondence with nonvolatile memory cells of one row in the memory array 901. At the time of writing, write data is sequentially stored in the register circuits in the data register 903. At the time of reading, data read from the nonvolatile memory cells in a selected row is held in the data register 903.

The nonvolatile semiconductor memory device 900 further includes: a data output buffer 910 and an address/data input buffer 911 which are coupled to a data/address terminal (pad) group 917; a write data input driver 908 for generating internal write data in accordance with write data applied from the address/data input buffer 911 and applying the internal write data to the Y gate 906 in a data writing operation mode; a Y address counter 907 for performing a counting operation with the Y address signal received from the address/data input buffer 911 being an initial value, sequentially shifting the Y address, and supplying a resultant Y address signal to the Y decoder 905; and a read data output amplifier 909 for amplifying read data selected by the Y gate 906 and applying resultant data to the data output buffer 910.

In the nonvolatile semiconductor memory device, data and an address are transferred via the data/address terminal group 917. In applying a command for instructing an operation mode, a command and an address signal are simultaneously supplied to a data terminal and an address terminal in the data/address terminal group 917. Thereafter, in writing data, write data is supplied to the data terminal in the data/address terminal group 917. FIG. 23 shows a case where 8-bit data DQ<7:0> is inputted and outputted as an example.

The nonvolatile semiconductor memory device 900 further includes: an OE buffer 919 for buffering an output enable signal OE applied via an input terminal (hereinafter, called a pad) 918 for application to the address/data input buffer 911 and a command decoder 912; a CE buffer 921 for buffering a chip enable signal CE supplied via a pad 920 for application to the address/data input buffer 911, the data output buffer 910, and the command decoder 912; a WE buffer 923 for buffering a write enable signal WE applied to the pad 920 for application to the command decoder 912; an RES buffer 925 for buffering a reset signal RES applied to a pad 924 for application to the signal to the command decoder 912; a buffer 927 for buffering a signal (external arbitrary signal other than the above signals) ETC for application to the command decoder 912; and an SC buffer 929 for buffering a shift clock signal SC applied to a pad 928 for application to the Y address counter 907.

An internal output enable signal from the OE buffer 919 is applied to the data output buffer 910. When the output enable signal OE is made active, the data output buffer 910 is activated and applies data received from the read data output amplifier 909 to the pad group 917. The chip enable signal CE attains an active state, to designate that the nonvolatile semiconductor memory device 900 is selected and a data access is performed. The data access means writing, reading and erasing operations. In accordance with the internal signals from the buffers 919, 921, 923, 925, and 927, the command decoder 912 decodes a command applied from the address/data input buffer 911 and generates an operation mode instruction signal instructing a designated operation mode.

The nonvolatile semiconductor memory device 900 further includes: a read/write/erase control circuit 913 for performing a control for executing the designated operation in response to the operation mode instruction signal from the command decoder 912; a reference voltage generating circuit 914 for generating reference voltages Vref1 and Vref2 at predetermined voltage levels under the control of the read/write/erase control circuit 913; a high voltage generating circuit 915 for generating positive high voltages VPP1 and VPP2 necessary for programming/erasing data under the control of the read/write/erase control circuit 913; and a high voltage generating circuit 916 for generating negative high voltages VNN1 and VNN2 under the control of the read/write/erase control circuit 913.

In FIG. 23, the high voltages VPP1, VPP2, VNN1 and VNN2 from the high voltage generating circuits 915 and 916 are shown being applied to the X decoder 902. The high voltages may be, however, transmitted to a bit line (memory cell column) via the Y gate 906 or may be applied to a substrate region in the memory array 901. The nonvolatile memory cell is constructed by a stack gate type field effect transistor having a floating gate and a control gate. Data is stored in accordance with an accumulation amount of charges in the floating gate.

At the time of injecting electrons to the floating gate, a positive high voltage is applied to the control gate, and a ground voltage or a negative high voltage is applied to the substrate region or drain region (bit line). In injecting electrons to the floating gate, channel hot electrons (CHE) injection or injection of electrons by an FN (Fouler-Nordheim) tunneling current is performed. The injection method differs according to the configuration of the nonvolatile semiconductor memory device. On the other hand, in the case of ejecting electrons from the floating gate of the nonvolatile memory cell, the negative high voltage or ground voltage is applied to the control gate, and the positive high voltage or ground voltage is applied to the drain or the substrate region. The voltage level of the high voltage to be used differs according to the operation modes. A high voltage at a necessary voltage level is generated from the high voltage generating circuits 915 and 916 for each of the operation modes.

Each of the high voltage generating circuits 915 and 916 determines the level of a high voltage to be generated, according to the reference voltages Vref1 and Vref2 from the reference voltage generating circuit 914. For example, such a adjusting scheme is employed that the high voltage VPP1 is voltage-divided and the divided voltage level is made equal to the level of the reference voltage Vref1. The high voltage generating circuit 915 determines the voltage level of the high voltage VPP1. For the negative high voltages VNN1 and VNN2, the voltage level is determined similarly. The negative voltage is level-sifted to be compared with the reference voltage, and the voltage levels of the negative high voltages VNN1 and VNN2 to be generated are set according to a comparison result, and accordingly, a necessary voltage is internally generated stably.

A power supply voltage VCC and a ground voltage VSS are applied externally to the nonvolatile semiconductor memory device 900. The reference voltage generating circuit 914 and the high voltage generating circuits 915 and 916 generate a reference voltage and a high voltage from the power supply voltage VCC and the ground voltage VSS.

The shift clock signal SC is applied upon writing/reading data. The Y address counter 907 sequentially increments or decrements the address from the initial value in accordance with the shift clock signal SC and supplies a resultant address to the Y decoder 905. That is, in accordance with the shift clock signal SC, writing/reading of data is executed externally of the memory device.

The voltage level of each of voltages from the reference voltage generating circuit 914 and the high voltage generating circuits 915 and 916 has to be accurately set. When each of the high voltages VPP (generically referring to VPP1 and VPP2) and VNN (generically referring to VNN1 and VNN2) is not at an accurate voltage level, programming/erasing is performed insufficiently. In order to monitor whether the reference voltage generating circuit 914 and the high voltage generating circuits 915 and 916 generate the internal voltages (reference voltage and positive and negative high voltages) at desired voltage levels at a test stage, pads PA1 to PA6 for monitoring are provided for the reference voltage generating circuit 914 and the high voltage generating circuits 915 and 916. Via the pads PA1 to PA6, the high voltages and the reference voltage are monitored externally and an internal circuit is operated forcedly by externally applying a voltage, with an external tester. The configuration of each of the sections will now be briefly described.

FIG. 24 is a diagram showing signals generated by the command decoder 912 and the read/write/erase control circuit 913 shown in FIG. 23. The command decoder 912 receives an 8-bit signal from a data input (DIN) buffer 911a included in the buffer 911 at an input node DATA<7:0>, receives the write enable signal WE from the WE buffer 923 at an input node WEIN, and receives a reset signal from the RES buffer 925 at an input node RESIN. In response to the rising edge of the write enable signal WE, the command decoder 912 decodes the 8-bit signal applied from the DIN buffer 911a and activates an operation mode instruction signal corresponding to the designated operation mode in accordance with the decoding result. In FIG. 24, a reading mode instruction signal φRE, an erasing mode instruction signal φER, and a programming mode instruction signal φPR are shown.

When the designated operation mode is completed, the write/read/erase control circuit 913 applies an operation completion instruction signal φCP to the command decoder 912 so that the command decoder 912 inactivates the operation mode instruction signal that is in the active state. In the write/read/erase control circuit 913, an operation of verifying whether or not data is accurately written in a memory cell is performed in writing data. The verifying operation is also executed under the control of the control circuit 913. Until the verifying operation is completed and memory cell data is accurately written in the selected memory cell, the operation completion instruction signal φCP is maintained in an inactive state.

The operations in writing data will now be briefly described with referring to a signal waveform diagram of FIG. 25. In writing data, a command "10h" instructing a writing mode is supplied to the DIN buffer 911a. When the write enable signal WE goes low to the L level, the command decoder 912 determines that a valid command is applied, decodes the command "10h" supplied from the DIN buffer 911a in response to the rising edge of the write enable signal WE, and sets the programming mode instruction signal φPR into an active state.

In response to the activation of the programming mode instruction signal φPR, the write/read/erase control circuit 913 causes the X address buffer 904 and the Y address counter 907 to accept an address from the address input buffer included in the address/data input buffer 911 from the next cycle. The Y address counter 907 performs a counting operation in accordance with the shift clock signal SC from the SC buffer 929 and sequentially changes the Y address from the initial value. The Y gate 906 is made conductive in accordance with the column selection signal from the Y decoder 905 and data is stored in the selected register circuit in the data register 903.

In the memory array 901, the X decoder 902 applies the high voltage VPP or VNN to a selected row in accordance with the high voltage VPP or VNN from the high voltage generating circuit 915 or 916. According to the method of programming data into the memory cell, a voltage corresponding to the write data is transmitted to each of bit lines. Which one of the positive high voltage VPP and negative high voltage VNN is applied to the X decoder 902 in the writing operation is determined according to the method of programming data to a memory cell. Here, in the writing operation, a memory cell is set into an erasure state or a programmed state in accordance with write data. When writing of necessary data is completed and all the data are accurately written, the write/read/erase control circuit 913 activates the operation completion instruction signal φCP. In response to the activation of the operation completion instruction signal φCP, the command decoder 912 makes the programming mode instruction signal φPR inactive.

Referring to FIG. 26, operations of the command decoder 912 and the write/read/erase control circuit 913 shown in FIG. 24 in the erasing mode will now be briefly described. The erasing mode is designated by supplying an erase command "20h". At the rising edge of the write enable signal WE, the command decoder 912 decodes the erasure command and activates the erasing mode instruction signal φER. In response to the activation of the erasing mode instruction signal φER, the write/read/erase control circuit 913 performs an operation necessary for erasing data.

According to whether the erasure is performed by injecting electrons into the floating gate or ejecting electrons from the floating gate, the high voltage generating circuits 915 and 916 generate the necessary high voltage(s) VPP and/or VNN. For example, when electrons are injected into the floating gate in the erasing operation, a positive high voltage is applied to the word line which is designated to be erased. When the application of erasing pulses and the erasing verifying operation are completed in erasing operation and erasure of data in the designated region is normally completed, then the write/read/erase control circuit 913 activates the operation completion instruction signal ωCP. The command decoder 912 accordingly inactivates the erasing mode instruction signal φER, to complete the erasing operation designated by the erasing command "20h".

FIG. 27 is a diagram schematically showing the configuration of a section related to generation of a Y address. In accordance with a setting instruction signal φS from the control circuit 913, the Y address counter 907 takes in the Y address signal Y received from the address/data input buffer and is initialized to the Y address. The Y address counter 907 performs a counting operation synchronously with the rising edge of the shift clock signal SC applied from the SC buffer 929 and changes the value of output bits YAD<11:0> one by one. The Y decoder 905 decodes the count bits YAD<11:0> from the Y address counter 907 and supplies a column selection signal to the Y gate 905 in accordance with the decoding result. As shown in FIG. 28, the Y address counter 970 updates its counting value by one synchronously with the rising edge of the shift clock signal SC. In the selected row, therefore, columns are sequentially selected by the Y decoder 905. One row has 4K columns. Memory cells of eight bits are simultaneously selected by a single selecting operation of the Y gate 905. In each column address of the 4K column addresses, memory cells of eight bits (1 byte) are disposed. Therefore, one page has a size of 32 Kbits.

By generating the Y address signal internally in accordance with the shift clock signal SC, data can be written/read at high speed in accordance with, for example, a page mode.

FIG. 29 is a diagram schematically showing the configuration of an input buffer. Since the input buffer has the configuration similar to that of an input buffer which receives a chip select signal/CS, an input signal SIG is shown as a representative in FIG. 29. In FIG. 29, the input buffer includes: P-channel MOS transistors (insulated gate type field effect transistors) P0 and P1 which are connected in series between a power supply node 950 and an internal node 951; and N-channel MOS transistors N0 and N1 which are connected in parallel between the internal node 951 and ground node. The chip select signal /CS is applied to the gates of the MOS transistors P0 and N0, and the input signal SIG is applied to the gates of the MOS transistors P1 and N1 via the pad 940.

The chip select signal /CS is equivalent to the chip enable signal CE shown in FIG. 23, but is inverted in logic level. In an inactive state of the H level of the chip select signal /CS, the P-channel MOS transistor P0 is in an OFF state, and the N-channel MOS transistor N0 is in an ON state. In such a state, irrespective of the logic level of the input signal SIG, an internal signal IN from the internal node 951 is at the L level of the ground voltage VSS level. In the following, the chip select signal /CS is employed in place of the chip enable signal CE, but the implemented function is the same.

On the other hand, when the chip select signal /CS attains an active state at the L level, the MOS transistor P0 is turned on and the MOS transistor N0 is turned off. The MOS transistors P1 and N1 are coupled to the power supply node 950 via the MOS transistor P0, operate as a CMOS inverter, and generate the internal signal IN by inverting the input signal SIG applied to the pad 940. When the chip select signal /CS is in the active state at the L level, the internal signal is generated in accordance with an externally applied signal, and the nonvolatile semiconductor memory device can perform a designated operation.

FIG. 30 is a diagram showing an example of the configuration of the data output buffer. FIG. 30 shows one of the data output buffer circuits in the data output buffer 910 as a representative. In FIG. 30, the output buffer circuit includes: an inverter IV1 which receives an internal read data bit intQ; an inverter IV2 which receives an output enable signal /OE; an NAND circuit G1 which receives the internal read data bit intQ and an output signal of the inverter IV2; an NOR circuit G2 which receives an output signal of the inverter IV1 and the output enable signal /OE; a P-channel MOS transistor P2 which is made conductive, when the output signal of the NAND circuit G1 is at the L level, to transmit the power supply voltage VCC on a power supply node 955 to an output node 957; and an N-channel MOS transistor N2 which is made conductive, when the output signal of the NOR circuit G2 is at the H level, to drive the output node 957 to the ground voltage VSS level.

In reading data, a read command (for setting the chip select signal /CS to the L level and the write enable signal /WE to the H level) for instructing reading of data is supplied and the reading mode instruction signal φRE is responsively made active by the command decoder, so that a memory cell is selected and data is read internally. The output enable signal /OE is applied externally and controls the activation/inactivation of the data output buffer 910. When the output enable signal /OE is at the H level, an output signal of the NAND circuit G1 attains the high level, an output signal of the NOR circuit G2 attains the L level, both the MOS transistors P2 and N2 enter an OFF state, and the output buffer circuit enters an output high impedance state.

When the output enable signal /OE is set to the L level, the NAND circuit G1 and the NOR circuit G2 operate as an inverter. One of the MOS transistors P2 and N2 is turned on in accordance with the logic level of the internal read data bit intQ, and a data bit Q of the output node 957 is set to the H or L level, and data is read out externally.

FIG. 31A is a diagram showing voltages applied to the nodes at the time of injecting electrons to the floating gate in a nonvolatile memory cell. The memory cell includes: N-type impurity regions 962 and 964 formed at the surface of a P-type substrate 960; a floating gate 966 formed above a channel region between the impurity regions 962 and 964; and a control gate 968 formed above the floating gate 966. The impurity region 962 is connected to a source line S, and the impurity region 964 is connected to a bit line. The impurity regions 962 and 964 act as a source S and a drain D, respectively.

As shown in FIG. 31A, in the case of injecting electrons (e) from the substrate region 960 to the floating gate 966, a positive high voltage VPP is applied to the control gate 968. The impurity regions 962 and 964 are set in an electrically floating state. The substrate region 960 is set to the ground voltage or a negative voltage in accordance with the voltage level of the positive high voltage VPP. A voltage applied to the substrate region 960 is indicated by a reference character VN. Under this state, the electrons (e) flow in the form of Fowler-Nordheim (FN) tunneling current from the channel region in the substrate region 960 into the floating gate 966 and are accumulated in the floating gate 966. In this state, the threshold voltage of the memory cell increases. This state is referred to an erased or programmed state, according to the configuration of the memory cell array On the other hand, in the case of ejecting electrons from the floating gate 966, as shown in FIG. 31B, the negative high voltage VNN is applied to the control gate 968 and the source is set to a floating state. The substrate region 960 is held at the ground voltage level. A positive voltage or ground voltage is applied to the impurity region 964 in accordance with the voltage level of the negative high voltage VNN. Under this state, the electrons flow from the floating gate 966 to the bit line (drain) via the impurity region 964 by the F-N tunneling current, so that the electrons are ejected from the floating gate 966. This state is a state where the threshold voltage is reduced and is called a programmed or erased state.

In the case of writing or erasing data, the high voltages VPP and VNN are applied in a pulse form. The pulse width is predetermined according to the voltage levels of the high voltages VPP and VNN. When the levels of the high voltages VPP and VNN are lower than a predetermined value, electrons are not sufficiently injected or ejected, so that the writing/erasing operation cannot be completed within a time period determined by a specification value. Usually, in the erasing/writing operation, a verifying operation is performed after completion of the erasing/writing operation. When the number of application times of the erasing/programming pulse reaches a predetermined number and the writing/erasing operation has not been completed yet, it is determined that an error occurs.

The voltage level of each of the high voltages VPP and VNN is determined by the reference voltage Vref (Vref1 and Vref2). In order to check whether the high voltages VPP and VNN and the reference voltage Vref are accurately generated internally at predetermined voltage levels, the pads PA1 to PA6 are provided in correspondence with the internal voltages VPP, VNN and Vref. In a test at a wafer level, a probe is applied to a pad of the pads PA1 to PA6 corresponding to the internal voltage to be estimated, and the levels of the internal voltages VPP, VNN, and Vref are monitored. A voltage is forcedly applied externally to each of the monitoring pads PA1 to PA6 to operate the internal circuits, whether the internal circuits operate normally or not is identified, and the characteristics of the internal circuits are estimated even in an internal voltage failure.

The pads PA1 to PA6 for monitoring are, however, used only for a test. When the nonvolatile semiconductor memory device is assembled in a package, the pads are not connected to external pin terminals. After the packaging, the levels of voltages generated internally are not conventionally tested.

When a failure occurs in a circuit which generates an internal voltage during the period from the completion of the test at the wafer level to the completion of packaging of the nonvolatile semiconductor memory device, a test of the internally generated voltages when a failure occurs at a chip level cannot be carried out.

When the voltages generated internally are measured externally and a voltage is forcedly applied externally, it is necessary to connect all the monitoring pads PA1 to PA6 to external pin terminals. When there are extra external pin terminals and free external pin terminals are present, by connecting the monitoring pads to the free external pin terminals, the internal voltages can be monitored externally and the internal voltages can be forcedly set externally. In this case, however, when the number of the free pin terminals is smaller than the number of the internal voltages to be tested, all of the internal voltages cannot be tested. In the case of adding further external pin terminals for the test of the internal voltages, the size of the package becomes larger and the cost becomes higher.

The problem related to the test of the internal voltages after the packaging is not generally limited to the nonvolatile semiconductor memory device. A similar problem occurs in a semiconductor integrated circuit such as a DRAM (Dynamic Random Access Memory), in which an internal voltage is generated from an external voltage.

SUMMARY OF THE INVENTION

It is an object of the present invention to provide a semiconductor integrated circuit allowing a test of an internal voltage without increasing the number of external pin terminals after packaging.

It is another object of the invention to provide a semiconductor integrated circuit allowing a test on a plurality of internal voltages by using a minimum required number of external pin terminals.

A semiconductor integrated circuit according to the invention includes: an internal voltage generating circuit for generating an internal voltage different in voltage level from first and second power supply voltages supplied externally; a buffer circuit coupled to a pad; and a switching circuit for inactivating the buffer circuit and coupling the internal voltage generating circuit to the pad in response to a control signal.

A semiconductor integrated circuit according to another aspect of the invention includes: an internal voltage generating circuit for generating an internal voltage different in voltage level from first and second power supply voltages; an internal voltage transmission line for transmitting the internal voltage; a switching circuit for isolating the internal voltage transmission line and the internal voltage generating circuit from each other in accordance with a control signal and connecting the internal voltage transmission line to a pad; and a buffer circuit coupled to the pad and made inactive in response to the control signal.

By monitoring the internal voltage externally and forcedly setting the voltage level of the internal voltage externally via the pad to which the buffer circuit is coupled and which is used in a normal use, the internal voltage can be monitored and forcedly applied without increasing the number of external pin terminals.

By selectively reading or forcedly setting a plurality of internal voltages via a single pad, the plurality of internal voltages can be monitored and forcedly set externally by using the minimum number of pin terminals.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 27 is a diagram schematically showing the configuration of column selection signal generating circuitry in the semiconductor integrated circuit illustrated in FIG. 23;

FIG. 28 is a timing chart representing operations of circuits illustrated in FIG. 27;

FIG. 29 is a diagram showing the configuration of an input buffer circuit of the semiconductor integrated circuit illustrated in FIG. 23;

DETAILED DESCRIPTION OF THE PREFERRED EMBODIMENTS

Configuration of Whole Circuit

Figure 1:
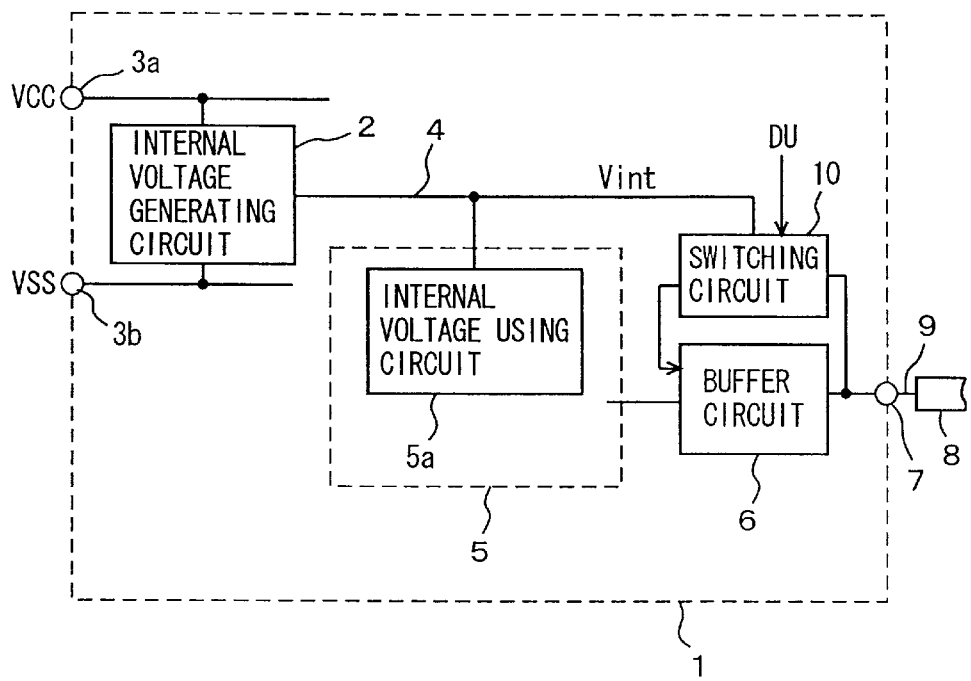
FIG. 1 is a diagram schematically showing the configuration of a whole semiconductor integrated circuit according to the invention.

FIG. 1 is a diagram schematically showing a whole configuration of a semiconductor integrated circuit according to the present invention. In FIG. 1, a semiconductor integrated circuit (semiconductor chip) 1 includes: an internal voltage generating circuit 2 for generating an internal voltage Vint from a high-level power supply voltage VCC and a low-level power supply voltage VSS that are applied to power supply pads 3a and 3b, respectively; an internal circuit 5 for performing a predetermined operation; a buffer circuit 6 coupled between the internal circuit 5 and a pad 7; and a switching circuit 10 for inactivating the buffer circuit 6 and transmitting the internal voltage Vint on an internal voltage transmission line 4 to the pad 7 when a test mode instruction signal (control signal) DU is activated. The pad 7 is coupled to an external pin terminal 8 via a bonding wire 9 after packaged.

The internal circuit 5 includes an internal voltage using circuit 5a which uses the internal voltage Vint on the internal voltage transmission line 4 and generates a signal/voltage having an amplitude of the internal voltage Vint level. The buffer circuit 6 is coupled to a predetermined signal processing circuit included in the internal circuit 5. When the internal voltage using circuit 5a performs an internal signal process operation, the buffer circuit 6 may be coupled to receive a signal from the internal voltage using circuit 5a.

In the semiconductor integrated circuit 1, in a normal state, the buffer circuit 6 is coupled to the external pin terminal 8 via the pad 7, buffers a signal for transference between the internal circuit 5 and the pad 7. In a test operation mode, the switching circuit 10 is made active, the buffer circuit 6 is made inactive, and the internal voltage Vint on the internal voltage transmission line 4 is transmitted to the pad 7. The pad 7 is therefore coupled to the external pin terminal 8, and a tester can externally monitor the voltage level of the internal voltage Vint via the pin terminal 8.

When the semiconductor integrated circuit is a nonvolatile semiconductor memory device described above, the internal voltage Vint is one of the positive high voltage VPP, the negative high voltage VNN, and the reference voltage Vref. By monitoring the internal voltage, through the external pin terminal 8 that is used in a normal operation, in a test mode, the internal voltage can be monitored without increasing the number of pins. The configuration in the case where the semiconductor integrated circuit 1 is a nonvolatile semiconductor memory device will be described hereinafter. In the following, the high-level power supply voltage VCC will be simply called a power supply voltage and the low-level power supply voltage VSS will be called a ground voltage.

First Embodiment

Figure 2:
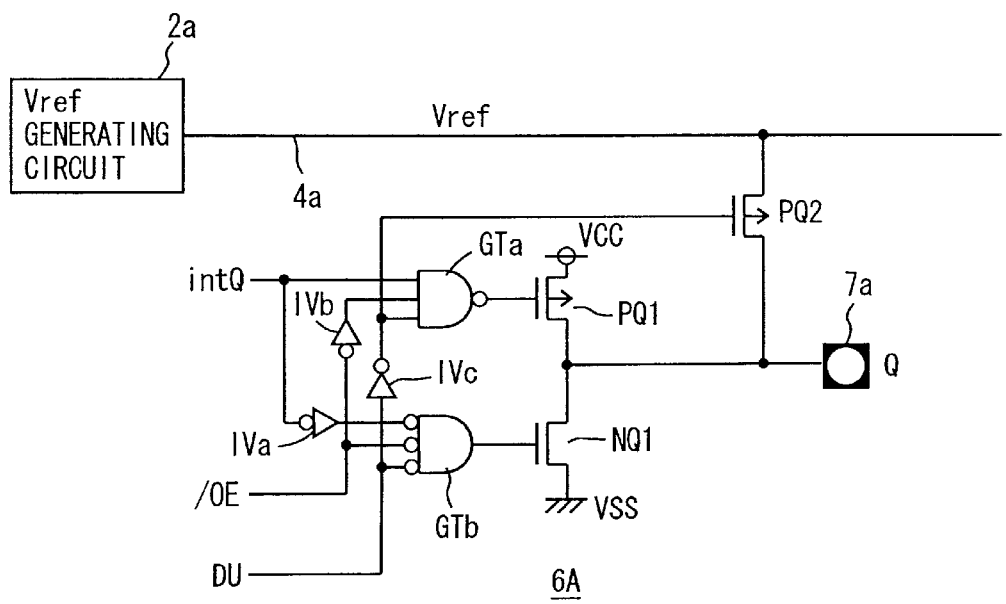
FIG. 2 is a diagram showing the configuration according to a first embodiment of the invention.

FIG. 2 is a diagram schematically showing the configuration of an output section of the semiconductor memory device according to a first embodiment of the invention. In FIG. 2, the buffer circuit 6 is an output buffer circuit 6A for buffering the internal read data bit intQ for outputting to a pad 7a. The output buffer circuit 6A includes: an inverter IVa which receives the internal read data bit intQ; an inverter IVb which receives a complementary output enable signal /OE of an inverted signal of the output signal OE; an inverter IVc which receives a test mode instruction signal (control signal) DU; an NAND circuit GTa for receiving output signals of the inverters IVb and IVc and the internal read data bit intQ; a three-input NOR circuit GTb for receiving the output of the inverter IVa, the output enable signal /OE, and the test mode instruction signal DU; a P-channel MOS transistor PQ1 which is made conductive when an output signal of the NAND circuit GTa is at the L level and transmits the power supply voltage VCC to the pad 7a; and an N-channel MOS transistor NQ1 which is made conductive when an output signal of the NOR circuit GTb is at the H level and transmits the ground voltage VSS to the pad 7a.

The switching circuit 10 includes a P-channel MOS transistor PQ2 which is made conductive when the test mode instruction signal DU attains the high level and couples a reference voltage transmission line 4a for transmitting the reference voltage Vref to the pad 7a. When the test mode instruction signal DU goes high to the H level, the NAND circuit GTa and the NOR circuit GTb output an H-level signal and an L-level signal, respectively, and the output buffer circuit 6A enters a disable state (inactive state). The switching circuit 10 includes the MOS transistor PQ2, a signal line for transmitting the control signal DU, and the inverter IVc.

The reference voltage Vref from a Vref generating circuit 2a for generating the reference voltage Vref is transmitted through the reference voltage transmission line 4a. The reference voltage Vref has an intermediate voltage level between the levels of the power supply voltage VCC and the ground voltage VSS.

When the test mode instruction signal DU is at the L level, the test mode instruction signal DU attains the H level of the power supply voltage VCC level, and the MOS transistor PQ2 is turned off. On the other hand, when the output enable signal /OE attains the L level, the NAND circuit GTa and the NOR circuit GTb operate as an inverter and drive the MOS transistors PQ1 and NQ1 in accordance with the internal read data bit intQ. When the output enable signal /OE is at the H level, output signals of the NAND circuit GTa and the NOR circuit GTb are at the H level and the L level, respectively, and both the MOS transistors PQ1 and NQ1 enter an OFF state.

On the other hand, when the test mode instruction signal DU attains the H level, the output signal of the inverter IVc attains the L level of the ground voltage VSS level. The MOS transistor PQ2 is turned on and the reference voltage transmission line 4a is coupled to the pad 7a. On the other hand, the NAND circuit GTa and the NOR circuit GTb output H-level and L-level signals, respectively, and both the MOS transistors PQ1 and NQ1 are turned off. The reference voltage Vref generated by the Vref generating circuit 2a is transmitted to the external pin terminal connected to the pad 7a, and the voltage level of the reference voltage Vref can be monitored externally.

When the output buffer circuit 6A is made inactive by the test mode instruction signal DU, the MOS transistor PQ2 is turned on, and the reference voltage transmission line 4a is connected to the pad 7a, thereby enabling the reference voltage Vref to be accurately transmitted to the external pin terminal via the pad 7a without being influenced by the output buffer circuit 6A. Consequently, the reference voltage Vref can be monitored externally without increasing the number of pin terminals.

Second Embodiment

Figure 3:
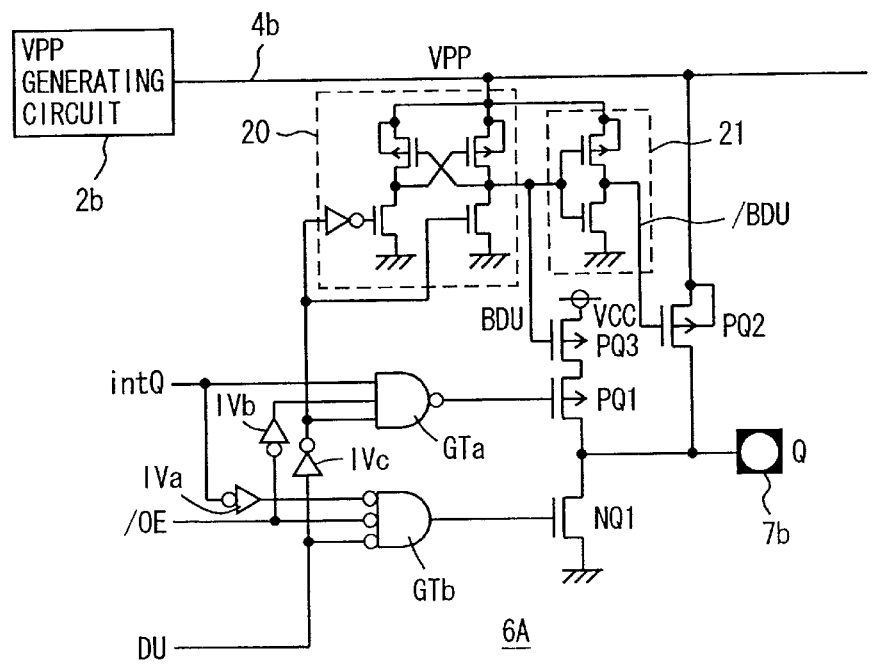
FIG. 3 is a diagram showing the configuration according to a second embodiment of the invention.

FIG. 3 is a diagram showing the configuration of the output section of a semiconductor memory device according to a second embodiment of the invention. In FIG. 3, in the output buffer circuit 6A, a P-channel MOS transistor PQ3 is connected between a power supply node for supplying the power supply voltage VCC and the P-channel MOS transistor PQ1. The other configuration of the output buffer circuit 6A is similar to that shown in FIG. 2. The corresponding parts are denoted by the same reference numerals and their detailed description is omitted here.

The switching circuit includes: a level shifting circuit 20 for converting the test mode instruction signal DU having the amplitude of the power supply voltage VCC level to a signal having the amplitude of the positive high voltage VPP level; a CMOS inverter 21 receiving the high voltage VPP as one of operation power supply voltages and inverting an output signal BDU of the level shifting circuit 20; and a P-channel MOS transistor PQ2 for coupling a high voltage transmission line 4b for transmitting the positive high voltage VPP to a pad 7b in accordance with an output signal /BDU of the CMOS inverter 21. The back gate and the source of the P-channel MOS transistor PQ2 are connected together to the high voltage transmission line 4b. The output signal BDU of the level shifting circuit 20 is applied to the gate of the MOS transistor PQ3.

A VPP generating circuit 2b is coupled to the high voltage transmission line 4b and the positive high voltage VPP higher than the power supply voltage VCC is transmitted to the high voltage transmission line 4b. In the case where the semiconductor integrated circuit device is a nonvolatile semiconductor memory device, the VPP generating circuit 2b is made active when the writing/erasing command is applied in a manner similar to the conventional example and generates the high voltage VPP at a predetermined voltage level. The operations of the configuration shown in FIG. 3 will now be described.

When the test mode instruction signal DU is at the L level, the output signal of the inverter IVc attains the H level, and the NAND circuit GTa and the NOR circuit GTb generate output signals in accordance with the internal read data bit intQ and the output enable signal /OE. In the level shifting circuit 20, an output signal of the inverter IVc is at the H level (power supply voltage VCC level), the output signal BDU attains the low level, and the MOS transistor PQ3 maintains the ON state. The output signal /BDU of the CMOS inverter 21 attains the H level of the high voltage VPP level, and the MOS transistor PQ2 is turned off. When the output enable signal /OE is at the H level, both the MOS transistors PQ1 and NQ1 are turned off, and the output buffer circuit 6A enters an output high impedance state. On the other hand, when the output enable signal /OE is at the L level, the NAND circuit GTa and the NOR circuit GTb each operate as an inverter, one of the MOS transistors PQ1 and NQ1 is turned on in accordance with the internal read data bit intQ, and a signal at the power supply voltage VCC level or a signal at the ground voltage level is transmitted to the pad 7b.

In reading data, even when the VPP generating circuit 2b stops the operation of generating the high voltage VPP and the voltage level of the high voltage VPP on the high voltage transmission line 4b becomes equal to or lower than that of the power supply voltage VCC, since the back gate and the source of the MOS transistor PQ2 are connected to the each other, the gate and source potentials thereof are equal to each other when the signal /BDU is at the H level. Therefore, irrespective of the voltage level of the pad 7b, the MOS transistor PQ2 normally maintains the OFF state. The MOS transistor PQ2 is formed in an N well region independent of other MOS transistors. When the drain voltage of MOS transistor PQ2 becomes higher than the gate voltage thereof and the N well constructing the back gate increases to the drain voltage level, the p-n junction in the source region enters a reverse-biased state. Consequently, it is prevented that a voltage is transmitted from the drain to the source of the MOS transistor PQ2, that is, the power supply voltage VCC of the pad 7b is prevented from being transmitted to the high voltage transmission line 4b.

When the test mode instruction signal DU is set at the L level, the NAND circuit GTa and the NOR circuit GTb are made inactive and both the MOS transistors PQ1 and NQ1 are turned off. On the other hand, the output signal BDU from the level shifting circuit 20 attains the H level and the MOS transistor PQ3 is turned off. The output signal /BDU of the CMOS inverter 21 attains the L level, the MOS transistor PQ2 is turned on, and the high voltage transmission line 4b is coupled to the pad 7b. When the high voltage VPP is applied to the pad 7b, the source region in the MOS transistor PQ1 is provided by a node receiving a high voltage, the output signal of the NAND circuit GTa is at the power supply voltage VCC level, and the gate voltage of the MOS transistor PQ1 is lower than the voltage of the pad 7b. Consequently, the MOS transistor PQ1 is turned on.

However, the gate of the MOS transistor PQ3 receives a signal at the high voltage VPP level. Even when the voltage level of the pad 7b attains the high voltage VPP level, the MOS transistor PQ3 is turned off. This is because when the back gate of the MOS transistor is not coupled to the source/drain, the node that receives a high voltage in the P-channel MOS transistor serves as a source. Consequently, even when the high voltage VPP is transmitted to the pad 7b, it can be reliably prevented that a current flows from the high voltage transmission line 4b to the node supplying the power supply voltage VCC. Even when the high voltage VPP higher than the power supply voltage VCC is applied to the pad 7b connected to the output buffer circuit 6A that receives the power supply voltage VCC as an operation power supply voltage, the voltage level of the high voltage VPP can be accurately monitored via the pin terminal connected to the pad 7b without exerting an adverse influence on the internal circuit.

According to the second embodiment of the invention as described above, the output buffer circuit is isolated from the power supply node supplying the power supply voltage VCC with the control signal of the high voltage level higher than that of the power supply voltage, and the high voltage transmission line is coupled to the pad. Even when the high voltage VPP is transmitted to the pad, it can be reliably prevented that a current flows in the power supply node, so that the high voltage VPP can be accurately monitored externally.

In the normal operating mode, when the operation of generating the high voltage VPP is stopped, the back gate and the source of the MOS transistor for connecting the high voltage transmission line to the output pad are connected to each other, and the control signal at the high voltage VPP level is supplied to the gate thereof. Consequently, the MOS transistor for connection can be reliably turned off. In the case where the high voltage VPP is not generated in the normal operating mode as well, no adverse influence is exerted on the operation of outputting a data bit of the output buffer circuit.

Third Embodiment

Figure 4:
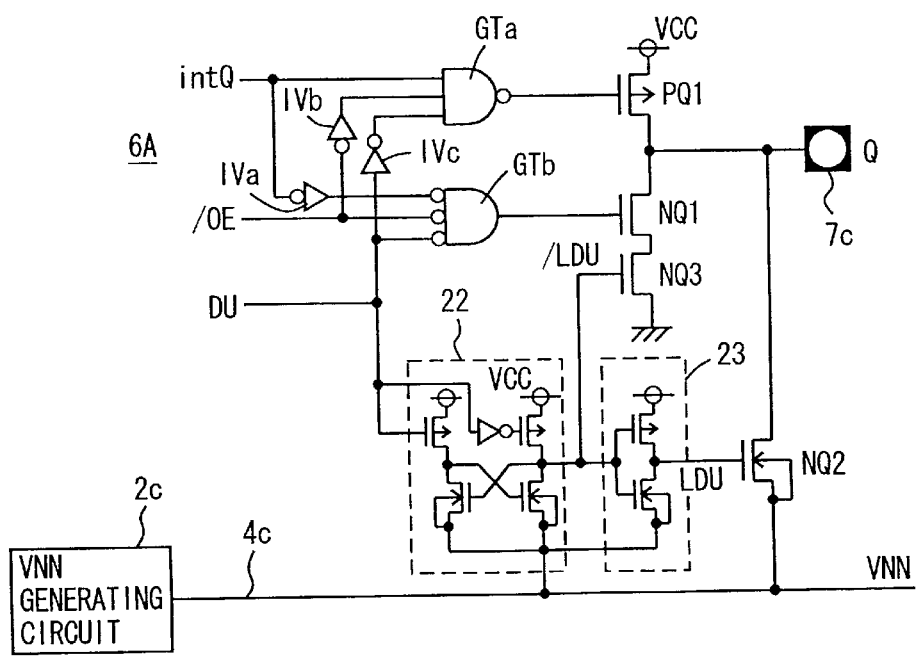
FIG. 4 is a diagram showing the configuration according to a third embodiment of the invention.

FIG. 4 is a diagram showing the configuration of the output section of a semiconductor memory device according to a third embodiment of the invention. In FIG. 4, the switching circuit includes: a level shifting circuit 22 for inverting the logic level of the test mode instruction signal DU and converting the test mode instruction signal DU into a signal /LDU that changes between the power supply voltage VCC and the negative high voltage VNN; a CMOS inverter 23 receiving the output signal /LDU of the level shifting circuit 22; and an N-channel MOS transistor NQ2 made conductive, when the output signal LDU of the CMOS inverter 23 is at the H level, to couple a pad 7c and a negative voltage transmission line 4c together. The back gate and the source of the MOS transistor NQ2 are connected to the negative voltage transmission line 4c. A VNN generating circuit 2c for generating a negative high voltage VNN is coupled to the negative voltage transmission line 4c.

In the output buffer circuit 6A, an N-channel MOS transistor NQ3 which receives the output signal /LDU of the level shifting circuit 22 at its gate is connected between the N-channel MOS transistor NQ1 at the output stage and the ground node. The other configuration of the output buffer circuit 6A is similar to that shown in FIG. 2. The corresponding parts are denoted by the same reference numerals and their detailed description is omitted here.

In the configuration shown in FIG. 4, when the test mode instruction signal DU is at the L level, in the output buffer circuit 6A, the NAND circuit GTa and the NOR circuit GTb operate according to the output enable signal /OE and the internal read data bit intQ. Since the test mode instruction signal DU is at the L level, the level shifting circuit 22 sets the output signal /LDU at the H level of the power supply voltage VCC level. The MOS transistor NQ3 is accordingly turned on and the source node of the MOS transistor NQ1 is coupled to the ground node. On the other hand, the output signal LDU of the CMOS inverter 23 is at the negative voltage VNN level and the MOS transistor NS2 is turned off.

In this state, when the output enable signal /OE is at the H level, the MOS transistors PQ1 and NQ1 are turned off and the output buffer circuit 6A enters a high output impedance state. When the output enable signal /OE goes low to the L level, one of the MOS transistors PQ1 and NQ1 is turned on according to the internal read data bit intQ, and a signal according to the logic level of the internal read data bit intQ is transmitted to the pad 7c.

When the voltage level of a signal applied from the output buffer circuit to the pad 7c is a level of the power supply voltage VCC or the ground voltage VSS, the gate of the MOS transistor NQ2 receives the negative voltage VNN from the VNN generating circuit 2c, so that the voltages at the gate, back gate, and source of the MOS transistor NQ2 are the same and an OFF state of the MOS transistor NQ2 is always maintained. Even if the VNN generating circuit 2c stops the negative voltage generating operation and the voltage on the negative voltage transmission line 4c attains the ground voltage level or higher, the voltage levels at the back gate, source, and gate of the MOS transistor NQ2 are the same and the OFF state thereof is maintained. Thus, in the normal operation, the voltage VNN on the negative voltage transmission line 4c can be prevented from exerting an adverse influence on the operation of the output buffer circuit 6A.

When the test mode instruction signal DU attains the H level, the NAND circuit GTa and the NOR circuit GTb output H-level and L-level signals, respectively, and the MOS transistors PQ1 and NQ1 are accordingly turned off. The output signal /LDU from the level shifting circuit 22 attains the voltage VNN level on the negative voltage transmission line 4c. When the voltage VNN from the VNN generating circuit 2c is equal to or lower than the ground voltage level, the MOS transistor NQ3 is turned off.

The output signal LDU of the CMOS inverter 23 attains the H level of the power supply voltage VCC level, the MOS transistor NQ2 is turned on, and the negative voltage transmission line 4c is coupled to the pad 7c. When the VNN generating circuit 2c is made active by a command and generates the negative high voltage VNN at a predetermined voltage level, the negative high voltage VNN is transmitted to the pad 7c via the MOS transistor NQ2, and the voltage level can be monitored externally. When the pad 7c is set at the voltage level of the negative high voltage VNN, the MOS transistor NQ1 receives a signal of the ground voltage level at its gate and is turned on. The MOS transistor NQ3, however, receives the signal /LDU at the negative high voltage VNN level on its gate, and maintains the OFF state when the voltage level of the pad 7c attains a level of the negative high voltage VNN. Consequently, it can be prevented that a current flows from the ground node to the negative high voltage VNN supply source, so that the voltage level of the negative high voltage VNN can be monitored externally.

The MOS transistor NQ2 is formed in an independent P-well and the source and the back gate thereof are connected to each other. When the voltages at the control gate, back gate, and source region in the MOS transistor become the same, a depletion layer is spread toward the inside, and the flow of the current from the drain region to the source region is stopped. Irrespective of the voltage level of the pad 7c relative to the voltage VNN on the negative voltage transmission line 4c in the normal operation, the MOS transistor NQ2 can be maintained in the OFF state.

In the case of monitoring the negative high voltage VNN externally, by generating a control signal at the negative high voltage VNN level by the level shifting circuit 22 and applying the control signal to the gate of the MOS transistor NQ3, a current can be prevented from flowing from the connection node to the negative high voltage VNN in the output buffer circuit 6A, and the voltage level of the negative high voltage VNN can be accurately monitored externally. By isolating the negative voltage transmission line 4c and the pad 7c from each other in the normal operating mode with the level-shifted control signal LDU, the voltage VNN from the VNN generating circuit 2c can be prevented from exerting an adverse influence on the operation of the output buffer circuit 6A in the normal operating mode.

Fourth Embodiment

Figure 5:
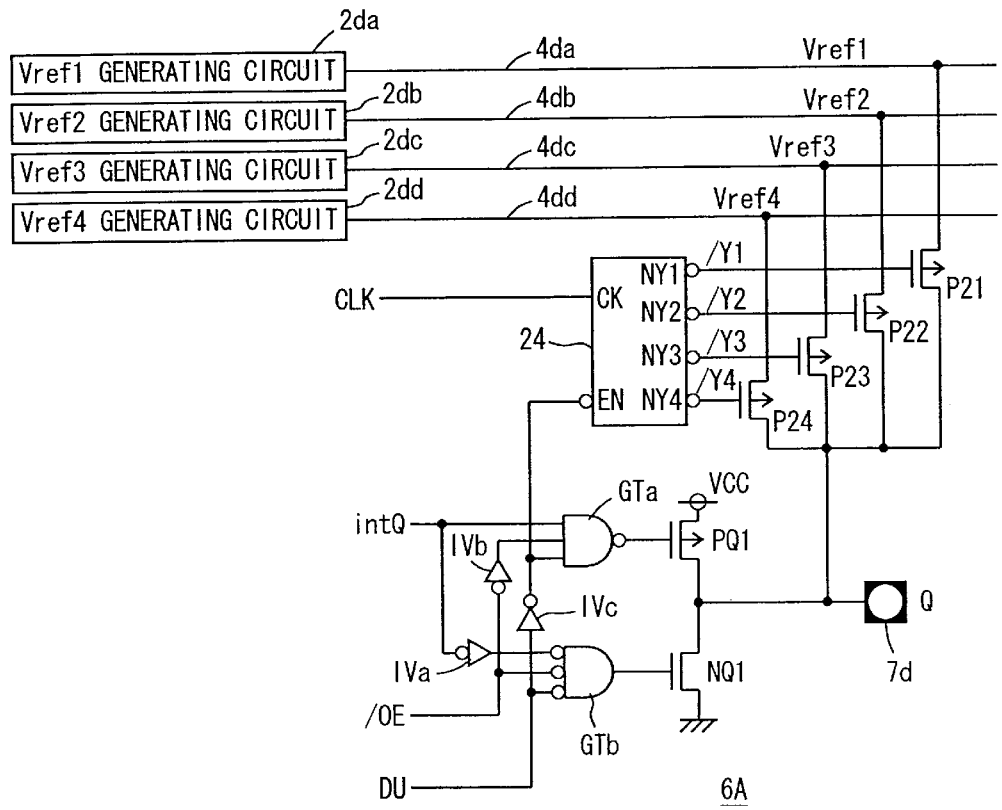
FIG. 5 is a diagram showing the configuration according to a fourth embodiment of the invention.

FIG. 5 is a diagram showing the configuration of the output section of a semiconductor memory device according to a fourth embodiment of the invention. In the configuration shown in FIG. 5, as an internal voltage generating circuit, the Vref1 generating circuit 2da to Vref4 generating circuit 2dd for generating four reference voltages Vref1 to Vref4, respectively, are provided. Each of the reference voltages Vref1 to Vref4 is at the voltage level between the power supply voltage VCC and the ground voltage VSS, and the reference voltages Vref1 to Vref4 are transmitted on reference voltage transmission lines 4da to 4dd.

As a switching circuit, a selection signal generating circuit 24 is provided, which is made active when the test mode instruction signal DU attains the H level, and which sequentially sets selection signals/Y1 to /Y4 from output nodes NY1 to NY4 to the L level of the selected state in accordance with a clock signal CLK. The selection signal generating circuit 24 is made inactive when the test mode instruction signal DU is at the L level, and sets all the selection signals /Y1 to /Y4 to the power supply voltage VCC level.

The switching circuit further includes P-channel MOS transistors P21 to P24 which are selectively made conductive in response to the selection signals /Y1 to /Y4 from the selection signal generating circuit 24 and connect the reference voltage transmission lines 4da to 4dd to the pad 7d. One of the selection signals /Y1 to /Y4 attains the L level (ground voltage level), one of the MOS transistors P21 to P24 is accordingly turned on, and one of the reference voltage transmission lines 4da to 4dd is connected to the pad 7d.

The configuration of the output buffer circuit 6A is similar to that of FIG. 2. The corresponding parts are designated by the same reference numerals, and the detailed description is omitted here.

In the configuration shown in FIG. 5, the operation in the normal operating mode is similar to that of each of the foregoing first to third embodiments. The output buffer circuit 6A operates according to the output enable signal /OE and the internal read data bit intQ.

In the normal operation mode, the test mode instruction signal DU is at the L level, the selection signal generating circuit 24 is in an inactive state, all the selection signals /Y1 to /Y4 are at the power supply voltage VCC level, and all the MOS transistors P21 to P24 maintain the off state. All the reference voltage transmission lines 4da to 4dd are therefore isolated from the pad 7d.

When the test mode instruction signal DU goes high to the H level, in a manner similar to the first to third embodiments, the output buffer circuit 6A enters a high output impedance state. The selection signal generating circuit 24 performs, for example, a shifting operation in accordance with the clock signal CLK applied to the clock input CK to sequentially set the selection signals /Y1 to /Y4 to the L level of the selected state. The MOS transistors P21 to P24 are sequentially turned on and the reference voltage transmission lines 4da to 4dd are sequentially connected to the pad 7d. The voltage level of each of the plurality of reference voltages Vref1 to Vref4 can be therefore monitored externally via the pad 7d.

The selection signal generating circuit 24 may be formed of, for example, a shift register which performs a shifting operation in accordance with the clock signal CLK. Although the generation of the clock signal CLK will be described in detail later, it is merely described here that the clock signal CLK is applied via an appropriate input pin terminal.

Figure 6:
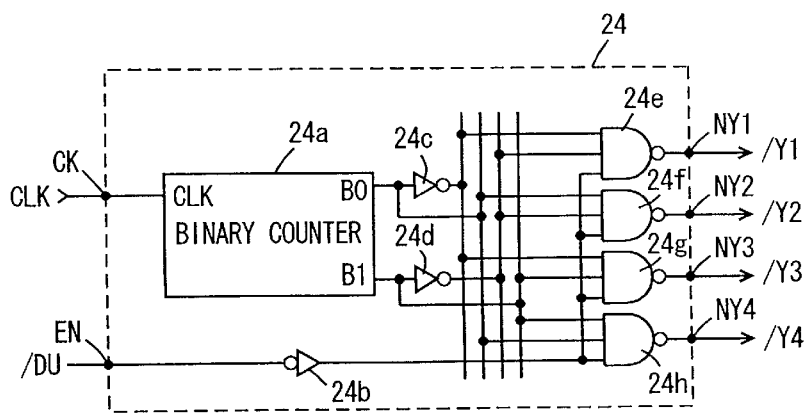
FIG. 6 is a diagram showing the configuration of a selection signal generating circuit illustrated in FIG. 5.

FIG. 6 is a diagram showing an example of a specific configuration of the selection signal generating circuit 24. In FIG. 6, the selection signal generating circuit 24 includes: a binary counter 24a for performing a counting operation in response to the rising edge of the clock signal CLK applied to the clock input CK; an inverter 24b receiving a complementary (inverted) test mode instruction signal /DU applied to the enable input EN; an inverter 24c receiving a least significant count bit B0 of the binary counter 24a; an inverter 24d receiving an upper bit B1 of the binary counter 24a; an NAND circuit 24e receiving output signals of the inverters 24b, 24c, and 24d and generating the selection signal /Y1 at the node NY1; an NAND circuit 24f which receives the least significant count bit B0 and output signals of the inverters 24b and 24d, and generates the selection signal/Y2 at the node NY2; an NAND circuit 24g which receives output signals of the inverters 24b and 24c and the upper count bit B1 and generates the selection signal/Y3 at the node NY3; and an NAND circuit 24h which receives the count bits B0 and B1 and an output signal of the inverter 24b and generates the selection signal /Y4 at the node NY4.

Figure 7:
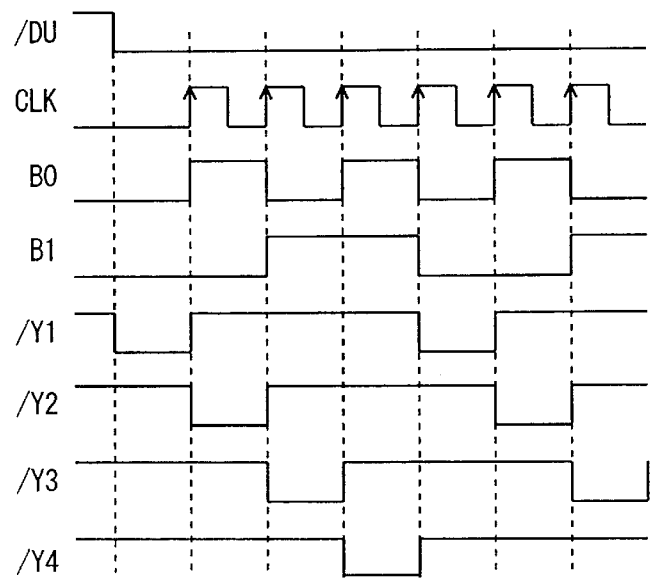
FIG. 7 is a timing chart representing operations of circuits illustrated in FIG. 6.

The clock signal CLK is supplied in the test mode in the present embodiment, and is set at the L level in the normal mode of operation. The operations of the selection signal generating circuit shown in FIG. 6 will be described with reference to the signal waveform chart of FIG. 7.

In the normal operation mode (operation mode other than the test operation mode), the test mode instruction signal /DU is at the H level, an output signal of the inverter 24b is at the L level, and all the selection signals /Y1 to /Y4 are at the H level. In such a state, preferably, the clock signal CLK is fixed at the L level and the binary counter 24a does not perform the counting operation. The count bits B0 and B1 of the binary counter 24a are reset to the initial value "00".

In the test mode, the test mode instruction signal /DU attains the L level, an output signal of the inverter 24b attains the H level, and the NAND circuits 24e to 24h enter an enabled state. Each of the count bits B0 and B1 of the binary counter 24a is "0" and the selection signal /Y1 attains the L level. The other selection signals /Y2 to /Y3 are set at the H level.

The reference voltage Vref1 is selected by the selection signal /Y1 and transmitted to the pad 7d. After monitoring the level of the reference voltage Vref1, the clock signal CLK is applied. The binary counter 24a performs the counting operation and the bit B0 becomes "1". The selection signal /Y2 accordingly goes low to the L level and the selection signal /Y1 attains the H level again. The other selection signals /Y3 and /Y4 maintain the H level. Subsequently, the binary counter 24a performs the counting operation synchronously with the rising edge of the clock signal CLK, and the selection signals /Y3 and /Y4 are sequentially activated to the L level in accordance with the count bits B0 and B1.

By decoding the count bits B0 and B1 of the binary counter 24a by the NAND circuits 24e to 24h, the selection signals /Y1 to /Y4 can be sequentially made active synchronously with the clock signals CLK.

First Modification

Figure 8:
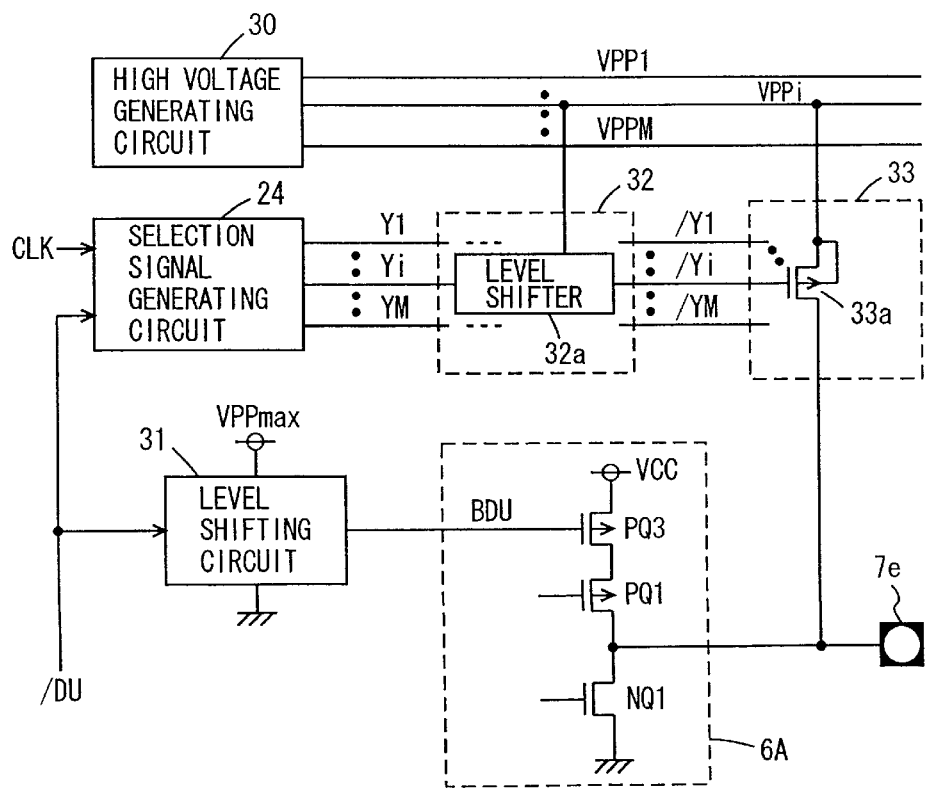
FIG. 8 is a diagram showing a modification of the fourth embodiment of the invention.

FIG. 8 is a diagram schematically showing the configuration of a first modification of the fourth embodiment of the invention. In FIG. 8, a high voltage generating circuit 30 generates a plurality of high voltages VPP1 to VPPM. The positive high voltages VPP1 to VPPM may be generated from different high voltage generating circuits. These high voltages may be different in voltage level from each other or may include voltages of the same level if their applications are different. The positive high voltages VPP1 to VPPM are at voltage levels higher than that of the power supply voltage VCC when generated.

There are provided: the selection signal generating circuit 24 for generating selection signals Y1 to YM in accordance with the clock signal CLK and the test mode instruction signal /DU in order to select the high voltages VPP1 to VPPM; a level shifting circuit 32 for shifting the selection signals Y1 to YM to selection signals /Y1 to /YM having amplitudes of the voltage levels of the corresponding high voltages VPP1 to VPPM, respectively, and each inverted in logic level; and a selection circuit 33 for selecting one of the high voltages VPP1 to VPPM in accordance with the selection signals /Y1 to /YM from the level shifting circuit 32 and connecting the selected one to a pad 7e.

In FIG. 8, in the level shifting circuit 32, a level shifter 32a receiving a selection signal Yi is shown as a representative. In the selection circuit 33, a P-channel MOS transistor 33a for selecting a high voltage VPPi in accordance with the selection signal /Yi from the level shifter 32a is shown as a representative. The P-channel MOS transistor 33a has its back gate and source coupled to receive the high voltage VPPi.

In the output buffer circuit 6A, the P-channel MOS transistor PQ3 is provided between the MOS transistor PQ1 at the output stage and the power supply node. A signal BDU from the level shifting circuit 31 for converting the amplitude of the test mode instruction signal /DU into that of a high voltage VPPmax level which is the highest level in the high voltages VPP1 to VPPM, is applied to the gate of the MOS transistor PQ3. The configuration of the level shifting circuit 31 is similar to that of the level shifting circuit 20 shown in FIG. 3. The configuration of the selection signal generating circuit 24 is similar to that of the selection signal generating circuit shown in FIG. 6. The level shifter 32a has the configuration similar to that of the level shifting circuit 20 shown in FIG. 3. A level shifter is provided for each of the selection signals Y1 to YM. The P-channel MOS transistor for selecting a high voltage is provided for each of the selection signals /Y1 to /YM.

In the configuration shown in FIG. 8, in the normal operation mode, the signal BDU outputted from the level shifting circuit 31 is at the L level and the output buffer circuit 6A outputs a signal to the pad 7e in accordance with the internal signal. All the selection signals /Y1 to /YM are at the H level. In the selection circuit 33, all the MOS transistors 33a are in the OFF state and the high voltages VPP to VPPM are isolated from the pad 7e.

In the test mode, the selection signal generating circuit 24 sequentially sets the selection signals Y1 to YM to the L level. The level shifting circuit 32 performs the level shifting in accordance with the selection signals Y1 to YM, thereby generating the selection signals /Y1 to /YM. When the selection signal /Yi attains the selected state, the selection signal Yi attains the low level, the MOS transistor 33a is turned on, and the high voltage VPPi is transmitted to the pad 7e. In the test mode, the output signal BDU of the level shifting circuit 31 is at the high voltage VPPmax level. Even when the high voltage VPPi is transmitted to the pad 7e, the MOS transistor PQ3 is reliably turned off, so that the voltage level of the high voltage VPPi can be accurately monitored externally via the pad 7e.

When any of the other high voltages VPP1 to VPPM (except VPPi) is selected, since the back gate and the source in the MOS transistor 33a are connected to each other and receive a corresponding high voltage, the MOS transistor 33a is reliably turned off when the high voltage is not selected irrespective of the voltage level of the selected high voltage VPP.

Second Modification

Figure 9:
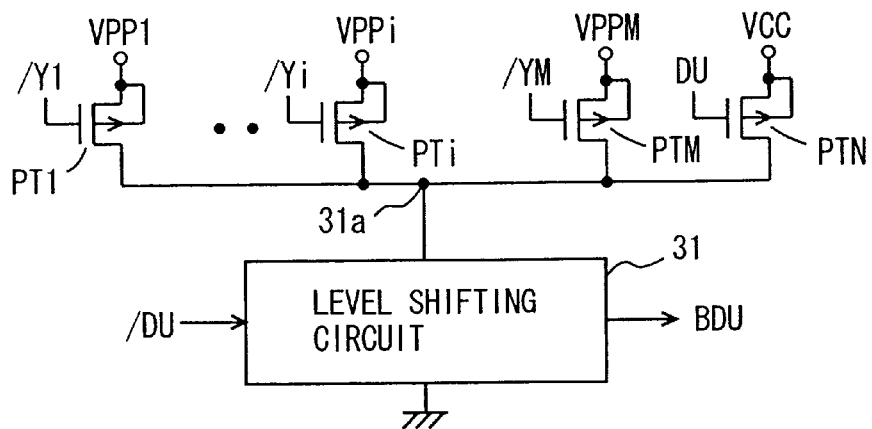
FIG. 9 is a diagram showing another modification of the fourth embodiment of the invention.

FIG. 9 is a diagram schematically showing the configuration of a second modification of the fourth embodiment of the invention. FIG. 9 shows the configuration of a portion of the level shifting circuit 31 for generating the signal BDU applied to the output buffer circuit 6A. The other configuration is similar to that shown in FIG. 8. In the configuration illustrated in FIG. 9, P-channel MOS transistors PT1 to PTM which receive he selection signals /Y1 to /YM at their gates and a P-channel MOS transistor PTN which receives the test mode instruction signal DU at its gate are connected to a power supply node 31a of the level shifting circuit 31. MOS transistors PT1 to PTM transmit the corresponding high voltages VPP1 to VPPM to the power supply node 31a when made conductive. MOS transistor PTN transmits the power supply voltage VCC to the power supply node 31a when made conductive. The back gate and the source in each of the MOS transistors PT1 to PTN are connected together to receive the high voltages VPP1 to VPPM and the power supply voltage VCC, respectively. Therefore, irrespective of the voltage level of the power supply node 31a, the voltage levels of the back gate, source, and control gate of each of the MOS transistors PT1 to PTN become the same when not selected, and they maintain the OFF state irrespective of the voltage level of the power supply node 31a when not selected. The signal BDU having an amplitude according to the selected high voltage is generated from the level shifting circuit 31 and is supplied to the control gate of the MOS transistor PQ3 in the output buffer circuit 6A shown in FIG. 6. Thus, in the output buffer circuit 6A, the MOS transistor PQ3 can be reliably turned off and the voltage levels of the high voltages VPP1 to VPPM can be accurately monitored externally.

The configurations shown in FIGS. 8 and 9 can be similarly applied for the negative high voltage VNN. A control signal having an amplitude of the negative high voltage level is supplied to a gate of an MOS transistor provided in series with the MOS transistor NQ1 in the output buffer circuit 6A in FIG. 8. An N-channel MOS transistor is used in the selection circuit 33.

As described above, according to the fourth embodiment of the present invention, a plurality of internal voltages are selectively coupled to the pad, the output buffer circuit coupled to the pad is made inactive, and the voltage level of the pad is monitored externally. A plurality of internal voltages can be therefore monitored externally by using a reduced number of pin terminals.

Fifth Embodiment

Figure 10:
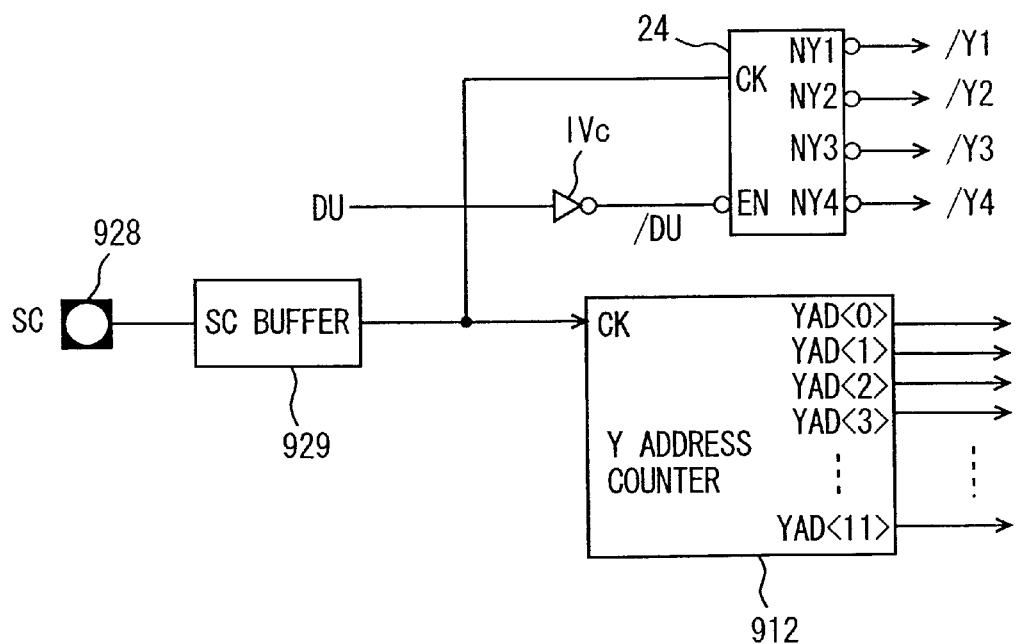
FIG. 10 is a diagram schematically showing the configuration according to a fifth embodiment of the invention.
Figure 23:
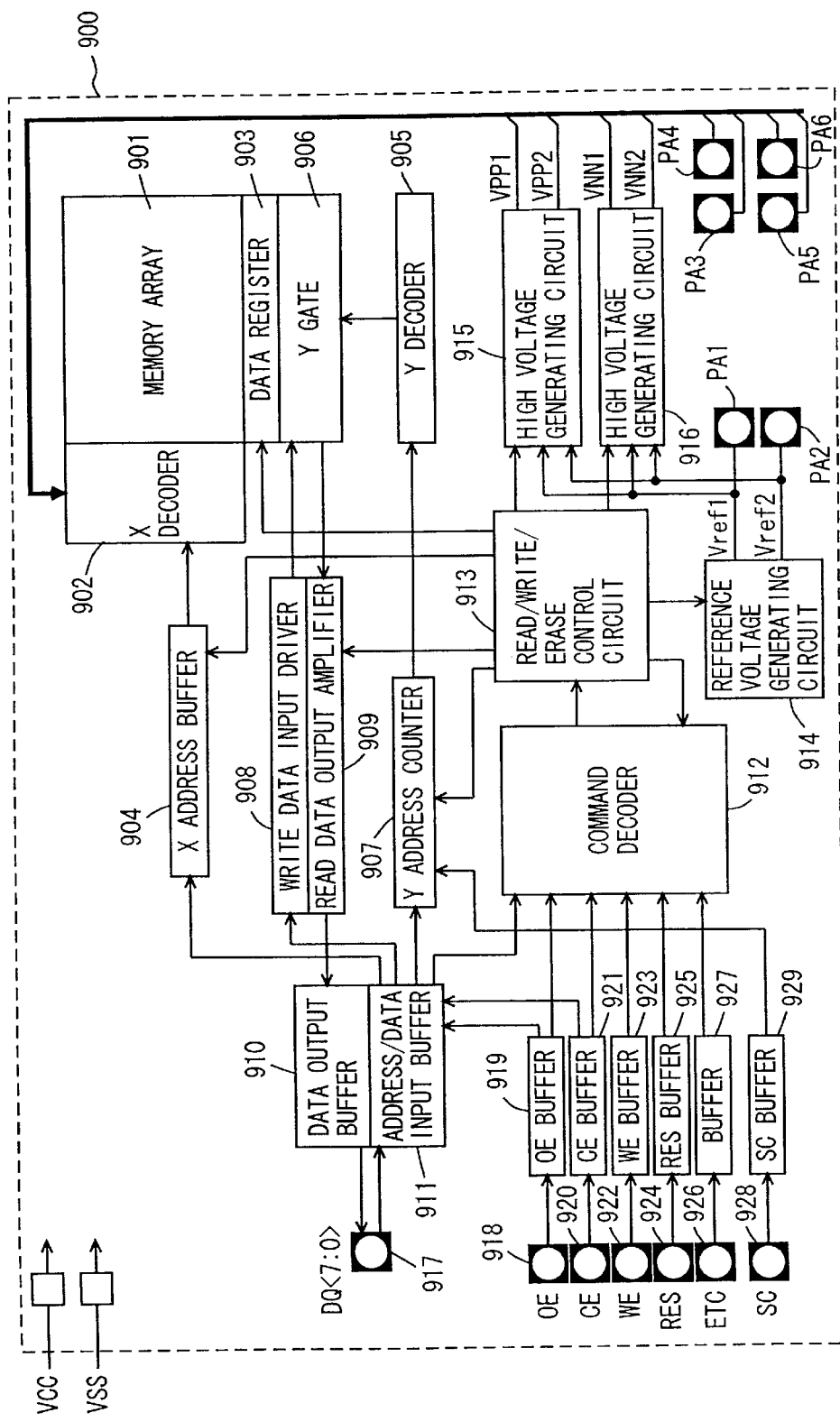
FIG. 23 is a diagram schematically showing a whole configuration of a conventional semiconductor integrated circuit.
Figure 24:
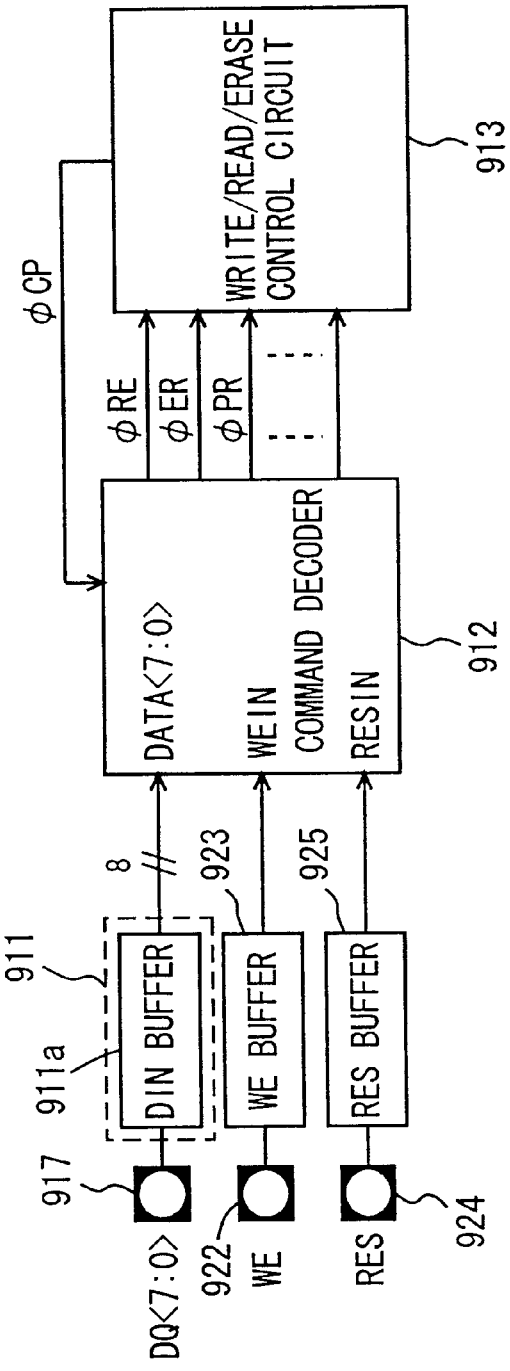
FIG. 24 is a diagram schematically showing the configuration of control signal generating circuitry in the semiconductor integrated circuit illustrated in FIG. 23.
Figure 25:
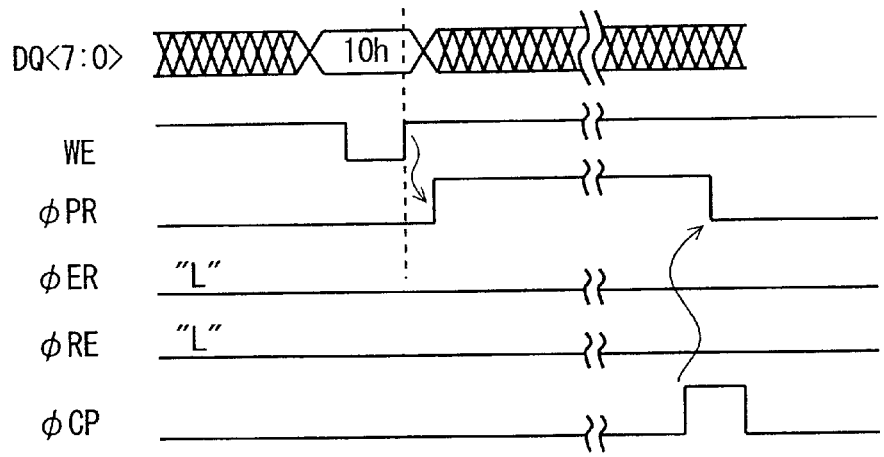
FIG. 25 is a diagram schematically showing signal waveforms at the time of a writing operation of the circuit illustrated in FIG. 24.
Figure 26:
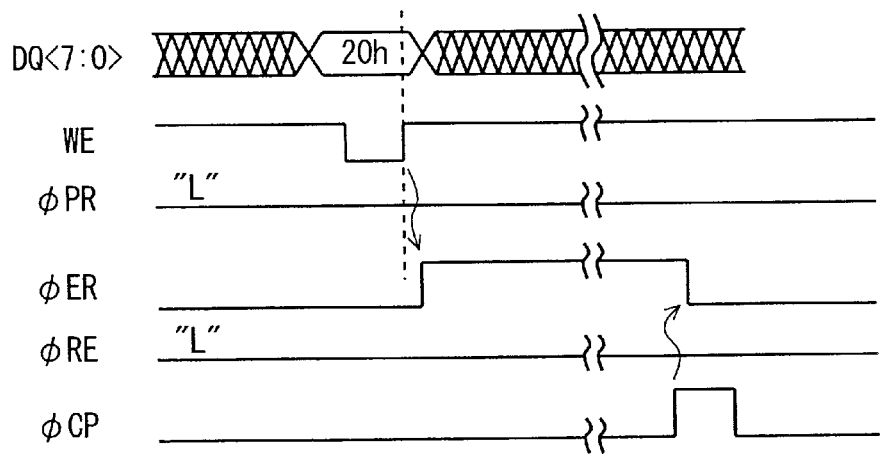
FIG. 26 is a signal waveform chart showing an erasing operation of the circuit illustrated in FIG. 24.
Figure 30:
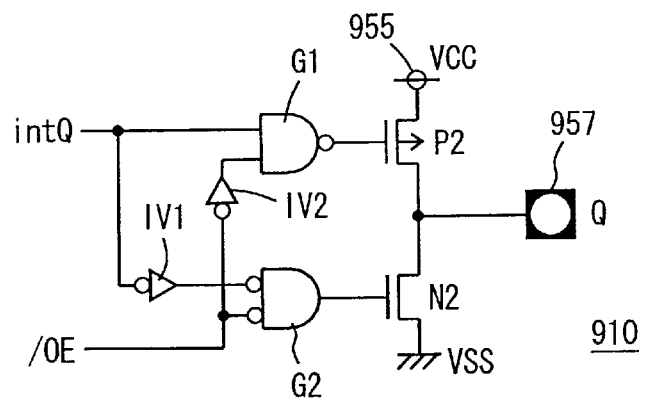
FIG. 30 is a diagram showing the configuration of an output buffer circuit of the semiconductor integrated circuit illustrated in FIG. 23.
Figure 31A:
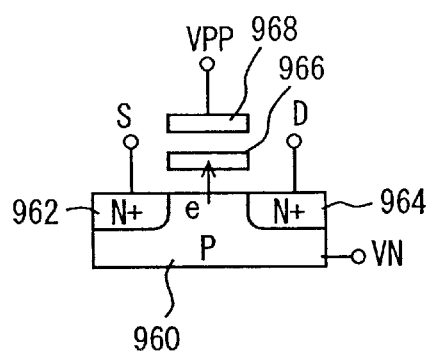
FIGS. 31A and 31B are diagrams showing voltages applied to a nonvolatile memory cell at the time of writing/erasing data.
Figure 31B:
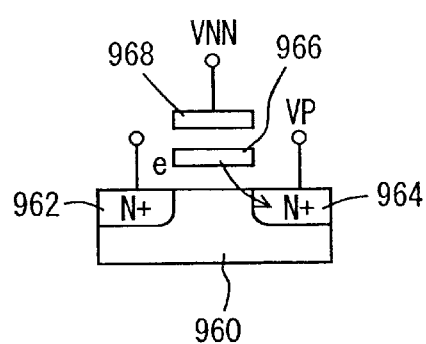

FIG. 10 is a diagram schematically showing the configuration of a fifth embodiment of the invention. In FIG. 10, the shift clock signal SC from the SC buffer 929 is supplied to the clock input CK in the selection signal generating circuit 24 that generates the selection signals /Y1 to /Y4. The SC buffer 929 also applies the shift clock signal SC to the clock input CK of the Y address counter 912 shown in FIG. 23. When a column has to be selected in data writing or reading, the shift clock signal SC is supplied from the pad 928 via the SC buffer 929 to the Y address counter 912, thereby sequentially updating the Y address.

In monitoring the internal voltage, by generating the selection signals /Y1 to /Y4 in accordance with the shift clock signal SC from the SC buffer 929, it is unnecessary to use the pin terminals for supplying a test-dedicated clock signal. When writing, erasing, or reading is instructed by a command, the Y address counter 912 is made active under the control of the read/write/erase control circuit 913 shown in FIG. 23. In this case, the voltage level of the internal voltage is simply monitored externally and it is unnecessary to select a column of memory cells in the memory array. While the test mode instruction signal DU is active, therefore, the Y address counter 912 may be held in an inactive state (reset state). It can be readily realized by stopping the counting operation of the Y address counter 912 by supplying the test mode instruction signal DU to the read/write/erase control circuit 913. When the high voltages VPP and VNN are generated in the writing/erasing operation, after data is stored in a data register before being written, then the data is written. In erasing, data is not stored in the data register. In the case of monitoring the internal voltage in parallel with the internal operation, even when the shift clock signal SC is toggled, no influence is exerted on the operation of the internal circuit. The internal circuit operates under the control of the control circuit 913.

As described above, according to the fifth embodiment of the invention, the shift clock for column selection is used as a clock signal for performing the shifting operation for selecting an internal voltage. Consequently, it is unnecessary to use an extra pin terminal and to provide the pin terminal, the input buffer circuit and an input protection circuit for protecting the input buffer circuit, each dedicated to a test. The circuit occupying area is therefore reduced, and the reliability for the clock signal for a test is also guaranteed since a circuit which is used in the normal operation is employed.

Sixth Embodiment

Figure 11:
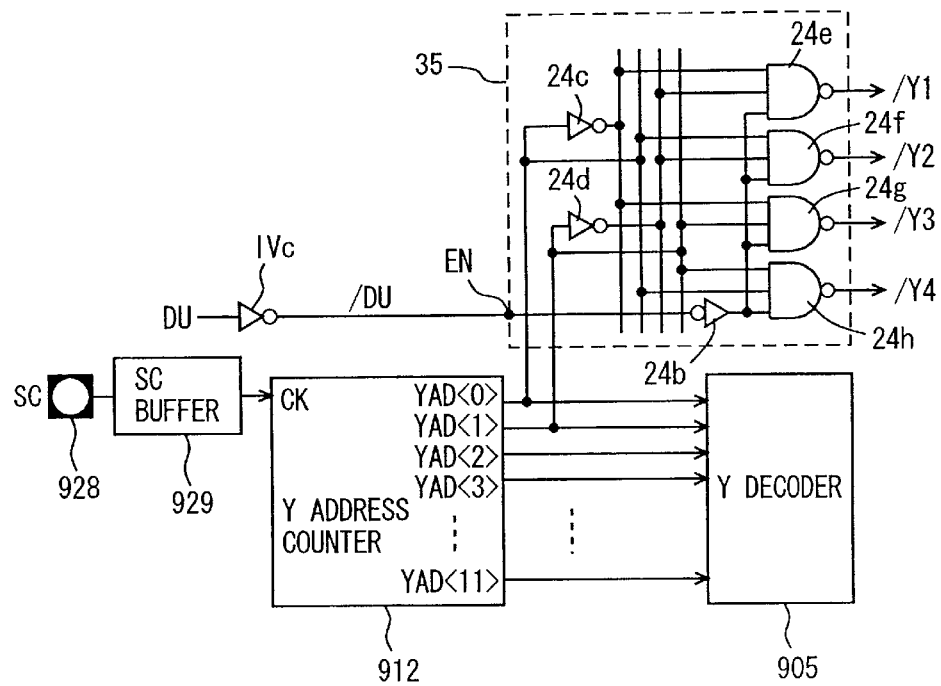
FIG. 11 is a diagram schematically showing the configuration according to a sixth embodiment of the invention.

FIG. 11 is a diagram schematically showing the configuration of a sixth embodiment of the invention. In the configuration shown in FIG. 11, lower address bits YAD<0> and YAD<1> from the Y address counter 912 are supplied to the selection signal generating circuit 35. The selection signal generating circuit 35 corresponds to the configuration of the decoding section of the selection signal generating circuit 24 shown in FIG. 6, and includes: the inverters 24c and 24d which receive the address bits YAD<0> and YAD<1>, respectively; the inverter 24b which receives the test mode instruction signal /DU through the inverter IVc; and the NAND circuits 24e to 24h which enter an enable state when an output signal of the inverter 24b is at the H level, to generate the selection signals /Y1 to /Y4 in accordance with the address bits YAD<0> and YAD<1> and complementary address bits /YAD<0> and /YAD<1> from the inverters 24c and 24d.

In the configuration shown in FIG. 11, the selection signal generating circuit 35 decodes the address bits YAD<0> and YAD<1> received from the Y address counter 912 and generates the selection signals /Y1 to /Y4. It is unnecessary to provide a dedicated counting circuit (shift register), so that the circuit occupying area is reduced.

Address bits YAD<11:0> from the Y address counter 912 are supplied to the Y decoder 905. In this case, the Y decoder 905 performs a decoding operation to select a column in selecting a register circuit in the data register. The high voltages VPP and VNN are generated when selection of the data register is not performed. In monitoring an internal voltage level, the decoding operation of the Y decoder 905 is stopped under the control of the control circuit 913.

The Y address counter 912 performs a counting operation in accordance with the shift clock signal SC from the SC buffer 929. The count value of the Y address counter 912 is initially set to "0" in a test mode in monitoring the voltage level.

The initial value of the Y address counter 912 is set to a Y address supplied externally when the counting operation of the Y address counter 912 is performed. In the operation mode of monitoring the internal voltage level externally, the count value of the Y address counter 912 is reset to the initial value, for example, in response to the activation of the test mode instruction signal DU. The Y address counter 912 may be constructed as in a serial EEPROM (Electrically Erasable Programmable ROM) in such a manner that a command, an X address and data are transferred via the same bus and the Y address is always started from the same count value of the Y address counter 912.

When the level of a voltage generated internally is monitored externally, the internal operation may be performed. The internal operation may be also inhibited except the internal voltage generating operation.

As described above, according to the sixth embodiment of the invention, an internal voltage is selected with the lower bit of the Y address counter for column selection, so that the circuit occupying area is further reduced.

Seventh Embodiment

Figure 12:
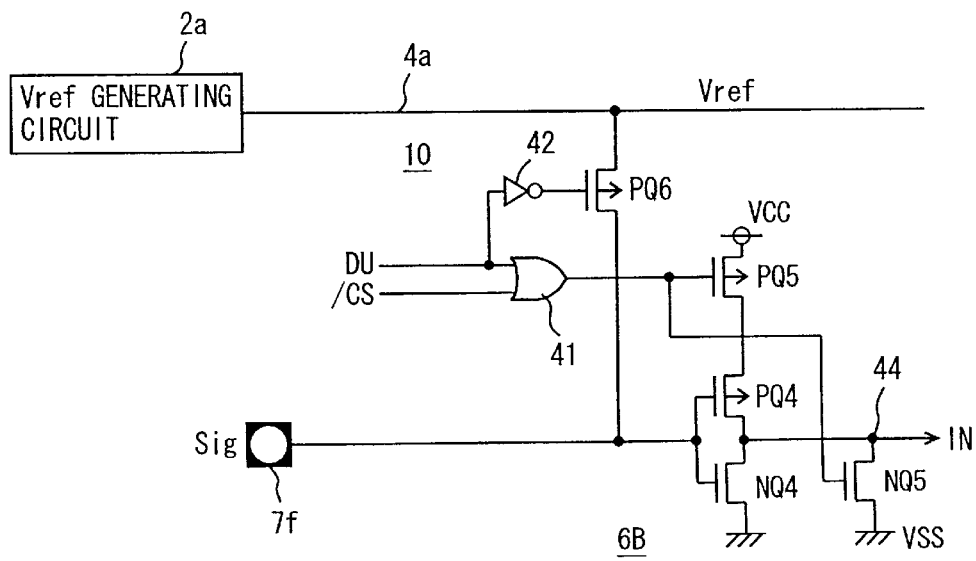
FIG. 12 is a diagram showing the configuration according to a seventh embodiment of the invention.

FIG. 12 is a diagram schematically showing the configuration of a seventh embodiment of the invention. In the configuration shown in FIG. 12, the buffer circuit 6 is an input buffer circuit 6B, and the reference voltage Vref generated internally is transmitted to a pad 7f connected to the input buffer circuit 6B. The input buffer circuit 6B includes: a P-channel MOS transistor PQ4 and an N-channel MOS transistor NQ4 receiving the signal Sig supplied to the pad 7f at their respective gates; an N-channel MOS transistor NQ5 for fixing an internal output node 44 to the ground voltage level when made conductive; and a P-channel MOS transistor PQ5 connected between the P-channel MOS transistor PQ4 and the power supply node.

The switching circuit 10 includes: an OR circuit 41 which receives the test mode instruction signal DU and the chip select signal /CS and applies an output signal to the gates of the MOS transistors PQ5 and NQ5; an inverter 42 which inverts the test mode instruction signal DU; and a P-channel MOS transistor PQ6 which is made conductive, when the output signal of the inverter 42 is at the L level, to couples the reference voltage transmission line 4a to the pad 7f. The reference voltage Vref is at the voltage level between the levels of the power supply voltage VCC and the ground voltage VSS. The OR circuit 41 and the inverter 42 receive the power supply voltage VCC as one operation power supply voltage. The reference voltage Vref is transmitted from the Vref generating circuit 2a onto the reference voltage transmission line 4a.

When the test mode instruction signal DU is at the L level, the output signal of the inverter 42 is at the H level, the MOS transistor PQ6 is turned off, and the reference voltage transmission line 4a and the pad 7f are isolated from each other. The signal applied to the pad 7f is at the power supply voltage VCC level and the MOS transistor PQ6 maintains an OFF state (the MOS transistor PQ6 is made conductive only when an overshoot occurs at the pad 7f). In such a state, the logic level of an output signal of the OR circuit 41 is determined according to the logic level of the chip select signal /CS. When the chip select signal /CS is at the H level, the MOS transistor PQ5 is turned off, the MOS transistor NQ5 is turned on, the MOS transistor PQ4 is isolated from the power supply node, and the internal signal IN of the internal node 44 is fixed at the ground voltage VSS level. When the chip select signal /CS attains the L level, the MOS transistor PQ5 is turned on and the MOS transistor NQ5 is turned off. The MOS transistor PQ4 is coupled to the power supply node, and the internal signal IN is generated according to the signal Sig applied to the pad 7f.

When the test mode instruction signal DU attains the H level, the output signal of the OR circuit 41 attains the H level. Similarly to the case where the chip select signal /CS is at the H level, the input buffer circuit 6B is held in an inactive state and the internal signal IN is fixed at the ground voltage VSS level. On the other hand, the MOS transistor PQ6 is turned on and the reference voltage transmission line 4a is coupled to the pad 7f, thereby enabling the reference voltage Vref from the Vref generating circuit 2a to be monitored via the pad 7f. The reference voltage Vref is at the voltage level between the levels of the power supply voltage VCC and the ground voltage VSS, and both the MOS transistors PQ4 and NQ4 are turned on. The MOS transistor PQ5 is, however, turned off by the signal at the H level of the power supply voltage VCC level from the OR circuit 41, and generation of a through current in the input buffer circuit 6B is prevented.

As shown in FIG. 12, therefore, the input buffer circuit 6B is made inactive in the test mode and the reference voltage transmission line 4a is connected to the input pad 7f, thereby enabling the reference voltage Vref to be monitored externally via the pad and the external pin terminal connected to the input buffer circuit 6b. Thus, the internal voltage can be monitored through the pin terminal used in the normal operation mode.

Eighth Embodiment

Figure 13:
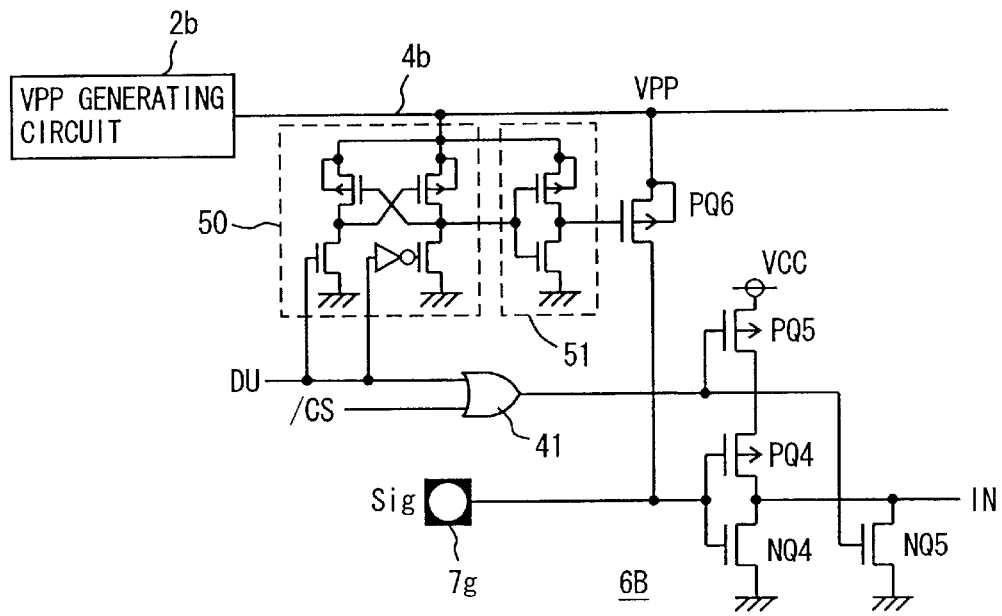
FIG. 13 is a diagram showing the configuration according to an eighth embodiment of the invention.

FIG. 13 is a diagram showing the configuration of an eighth embodiment of the invention. In FIG. 13, the positive high voltage VPP from the VPP generating circuit 3b is transmitted to an input pad 7g. The positive high voltage VPP is at a voltage level higher than the power supply voltage VCC. There are provided: a level shifting circuit 50 for converting the test mode instruction signal DU having an amplitude of the power supply voltage VCC level to a signal having an amplitude of the high voltage VPP level, in order to reliably turn off the MOS transistor PQ6 for connecting the reference voltage transmission line 4b and the input pad 7g; and a CMOS inverter circuit 51 for inverting an output signal of the level shifting circuit 50. An output signal of the CMOS inverter circuit 51 is applied to the gate of the P-channel MOS transistor PQ6. The level shifting circuit 50 does not convert the logic level. The CMOS inverter circuit 51 receives the high voltage VPP as one operation power supply voltage.

The configuration of the input buffer circuit 6B is similar to that of the input buffer circuit shown in FIG. 12 and the corresponding parts are designated by the same reference numerals.

In the configuration shown in FIG. 13, the same operation as that shown in FIG. 12 is performed when the test mode instruction signal DU is at the L level. The input buffer circuit 6B is selectively made active or inactive by the chip select signal /CS. The test most instruction signal DU is at the L level, an output signal of the level shifting circuit 50 is similarly at the L level of the ground voltage level, an output signal of the CMOS inverter 51 accordingly attains the high voltage VPP level, and the MOS transistor PQ6 is set to an OFF state. Both the back gate and the source of the MOS transistor PQ6 are connected to the high voltage transmission line 4b. Even when the voltage level of the signal Sig applied to the input buffer circuit 6B is higher than the level of the voltage generated by the VPP generating circuit 2b, the MOS transistor PQ6 is reliably fixed to the OFF state. By the MOS transistor PQ6, therefore, the high voltage transmission line 4b and the input pad 7g can be reliably isolated from each other irrespective of the voltage level of the signal Sig.

When the test mode instruction signal DU attains the H level, the output signal of the OR circuit 41 attains the H level (power supply voltage VCC level), and the MOS transistor PQ5 is turned off. On the other hand, the MOS transistor NQ5 is turned on and the input buffer circuit 6B is made inactive. The output signal of the level shifting circuit 50 attains the high voltage VPP level on the high voltage transmission line 4b, the output signal of the CMOS inverter 51 accordingly attains the H level, and the MOS transistor PQ6 is turned on. Consequently, the high voltage transmission line 4b is coupled to the pad 7g.

In FIG. 13, the CMOS inverter 51 may not be particularly provided. A signal obtained by inverting the logic level of the test mode instruction signal DU may be directly outputted from the level shifting circuit 50 and applied to the gate of the MOS transistor PQ6.

Modification

Figure 14:
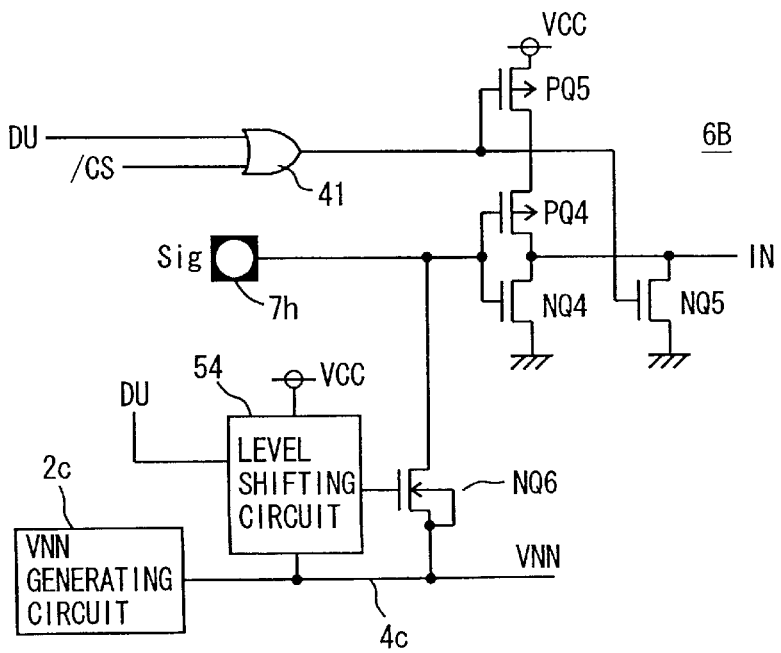
FIG. 14 is a diagram showing a modification of the eighth embodiment of the invention.

FIG. 14 is a diagram schematically showing the configuration of a modification of the eighth embodiment of the invention. In the configuration shown in FIG. 14, the negative high voltage VNN is transmitted to an input pad 7h. The input buffer circuit 6B is coupled to the input pad 7h. The configuration of the input buffer circuit 6B is the same as that of the input buffer circuit 6B shown in FIG. 13. Therefore, the corresponding parts are designated by the same reference numerals and their detailed description is omitted here.

In order to transmit the negative high voltage VNN to the input pad 7h, a level shifting circuit 54 and the N-channel MOS transistor NQ 6 are provided. The level shifting circuit 54 converts the test mode instruction signal DU having the amplitude of the power supply voltage VCC level to a signal which changes between the power supply voltage VCC level and the negative high voltage VNN level. The N-channel MOS transistor NQ6 selectively couples the input pad 7h to the negative voltage transmission line 4c in accordance with an output signal of the level shifting circuit 54. The back gate and the source of the MOS transistor NQ6 are connected to the negative voltage transmission line 4c.

When the test mode instruction signal DU is at the L level, a signal at the voltage VNN level on the negative transmission line 4c is generated from the level shifting circuit 54 and is applied to the gate of the MOS transistor NQ6. The MOS transistor NQ6 is responsively set in the OFF state irrespective of the voltage level of the signal Sig applied to the input pad 7h. That is, the signal Sig changes between the ground voltage and the power supply voltage VCC, and the negative high voltage VNN is at the voltage level lower than the ground voltage when generated. The gate, source, and back gate of the MOS transistor NQ6 are at the same voltage level, and the OFF state thereof can be reliably maintained. The input buffer circuit 6B generates the internal signal IN in accordance with the signal Sig applied to the input pad 7h without being influenced by the voltage level of the negative high voltage VNN on the negative voltage transmission line 4c when the chip select signal /CS is at the L level.

On the other hand, when the test mode instruction signal DU attains the H level, similarly to the configuration shown in FIG. 13, the input buffer circuit 6B is made inactive. The level shifting circuit 54 receives the test mode instruction signal DU, generates a signal at the power supply voltage VCC level, and applies the generated signal to the gate of the MOS transistor NQ6. The MOS transistor NQ6 is responsively turned on and the negative voltage transmission line 4c is connected to the input pad 7h. In accordance with the negative high voltage VNN on the negative voltage transmission line 4c, the MOS transistor PQ4 is turned on. However, the MOS transistor PQ5 is turned off in response to the output signal of the OR circuit 41. The MOS transistor NQ4 is in a deep OFF state by the negative high voltage VNN. Thus, the path of the through current in the input buffer circuit 6B is reliably cut off. In such a state, the voltage level of the negative high voltage VNN supplied from the VNN generating circuit 2c to the negative voltage transmission line 4c can be monitored externally via the input pad 7h.

As described above, according to the eighth embodiment of the invention, the test mode instruction signal is levelshifted or converted, the high voltage transmission line is connected to the input pad, and the input buffer circuit is made inactive. The positive or negative high voltage can be therefore accurately monitored externally without exerting an adverse influence on the buffer circuit. The voltage level of the high voltage can be monitored externally with the pin terminal connected to the input buffer circuit. Thus, it is unnecessary to provide a pin terminal dedicated to a test, so that the number of pin terminals is not increased.

Ninth Embodiment

Figure 15:
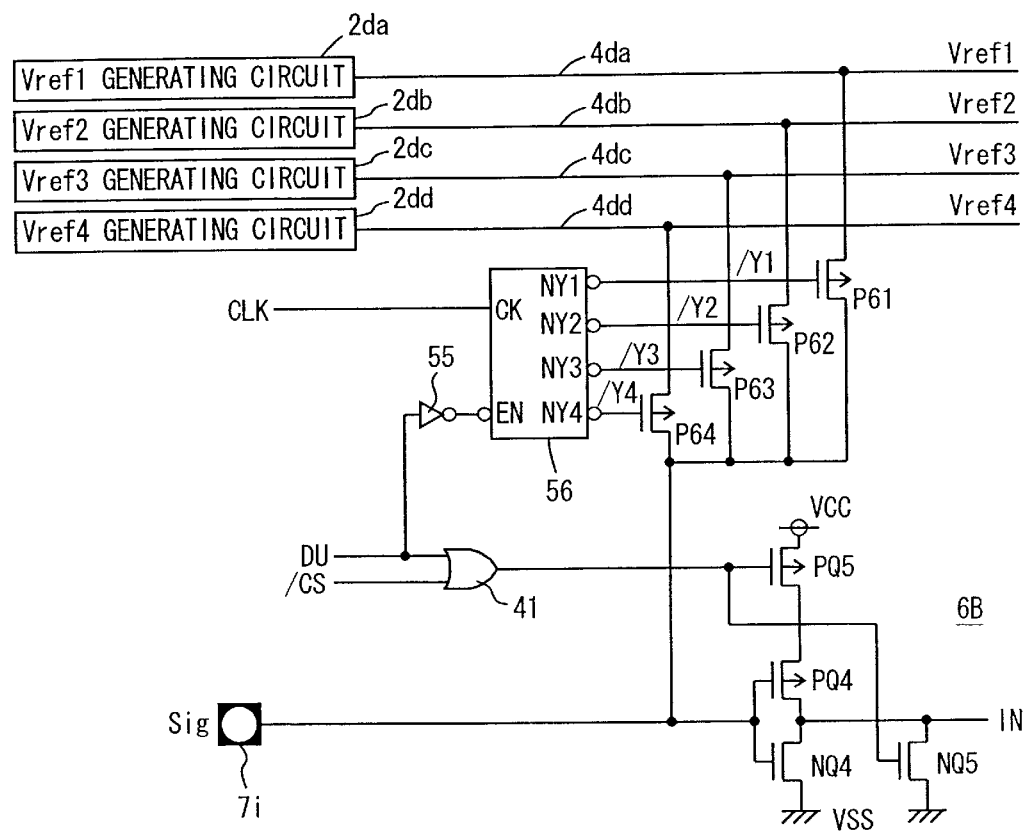
FIG. 15 is a diagram showing the configuration according to a ninth embodiment of the invention.

FIG. 15 is a diagram schematically showing the configuration of a ninth embodiment of the invention. In the configuration shown in FIG. 15, in a test mode, a plurality of reference voltages Vref1 to Vref4 are selectively transmitted to an input pad 7i. That is, the reference voltages Vref1 to Vref4 from Vref1 generating circuit 2da to Vref4 generating circuit 2dd are transmitted to the reference voltage transmission lines 4da to 4dd, respectively. A switching circuit for selecting the reference voltage includes: an inverter 55 which receives the test mode instruction signal DU; a selection signal generating circuit 56 which receives an output signal of the inverter 55 at an enable input EN, receives the clock signal CLK at a clock input CK, and performs a shifting operation (counting operation and decoding operation) to sequentially activate the column selection signals /Y1 to /Y4 to the L level; and P-channel MOS transistors P61 to P64 which are provided in correspondence to the selection signals /Y1 to /Y4 from the selection signal generating circuit 56, respectively, and are made conductive, when the corresponding selection signals /Y1 to /Y4 are in an active state, to transmit the reference voltages Vref1 to Vref4 to the input pad 7i.

The input buffer circuit 6B is made active or inactive according to an output signal of the OR circuit 41 that receives the test most instruction signal DU and the chip select signal /CS. The configuration of the input buffer circuit 6B is similar to those of FIGS. 13 and 14, and the corresponding parts are designated by the same reference numerals and their detailed description is omitted here.

The selection signal generating circuit 56 has the configuration similar to that of the selection signal generating circuit 24 shown in FIG. 5. Alternately, any of the configurations shown in FIGS. 6, 10, and 11 can be used therefor. The selection signal generating circuit 56 may simply be formed of a shift register for performing a shifting operation in accordance with the clock signal CLK.

In the configuration of the ninth embodiment as well, in the test operation mode, the input buffer circuit 6B is held in an inactive state by the output signal of the OR circuit 41. The selection signal generating circuit 56 receives the signal at the L level at the enable input EN and is made active to sequentially activate the column selection signals /Y1 to /Y4 in accordance with the clock signal CLK. Any one of the MOS transistors P61 to P64 is made conductive, and any one of the reference voltages Vref1 to Vref4 is transmitted to the input pad 7i. Each of the reference voltages Vref1 to Vref4 is at a voltage level between the power supply voltage VCC and the ground voltage VSS, and the MOS transistor PQ5 is in an OFF state in the input buffer circuit 6B, so that the path of a through current in the input buffer circuit 6B is reliably cut off.

When the test mode instruction signal DU is at the L level, the output signal of the inverter 55 is at the H level, all the selection signals /Y1 to /Y4 from the selection signal generating circuit 56 attain the H level of the power supply voltage VCC level, and all the MOS transistors P61 to P64 are turned off. Consequently, the reference voltage transmission lines 4da to 4dd are reliably isolated from the input pad 7i, and the voltages Vref1 to Vref4 are reliably prevented from exerting an adverse influence on the input buffer circuit 6B.

Modification

Figure 16:
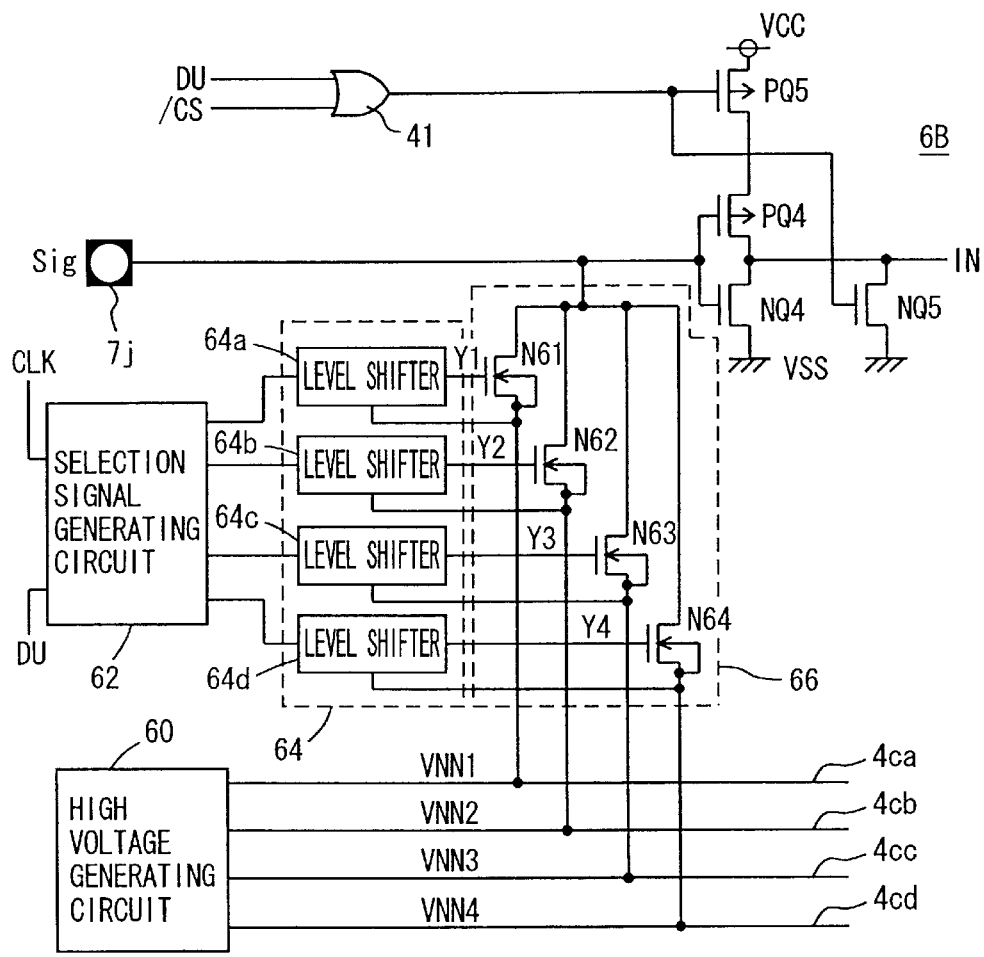
FIG. 16 is a diagram showing a modification of the ninth embodiment of the invention.

FIG. 16 is a diagram showing the configuration of a modification of the ninth embodiment of the invention. In FIG. 16, a high voltage generating circuit 60 generates a plurality of negative high voltages VNN1 to VNN4 onto negative voltage transmission lines 4ca to 4cd, respectively. A switching circuit for selecting one of the negative high voltages VNN1 to VNN4 includes: a selection signal generating circuit 62 which is made active in response to the activation of the test mode instruction signal DU and generates a selection signal by performing a shifting operation (counting operation and decoding operation) synchronously with the clock signal CLK; a level shifting circuit 64 for shifting the level of a selection signal from the selection signal generating circuit 62; and a selection circuit 66 for connecting one of the negative voltage transmission lines 4ca to 4cd to the input pad 7j in accordance with the signals Y1 to Y4 from the level shifting circuit 64.

The level shifting circuit 64 includes level shifters 64a to 64d provided in correspondence with the selection signals Y1 to Y4, respectively. The level shifters 64a to 64d receive the corresponding negative high voltages VNN1 to VNN4 as one operation power supply voltage and receive the power supply voltage VCC as the other operation power supply voltage. The selection signal generating circuit 62 generates a selection signal having the amplitude VCC. The selection signals Y1 to Y4 which change between the corresponding negative high voltages VNN1 to VNN4 and the power supply voltage VCC are generated by the level shifters 64a to 64d.

The input buffer circuit 6B has the configuration as that shown in FIG. 15, the corresponding parts are designated by the same reference numerals, and their detailed description is omitted here.

The back gate and the source in each of N-channel MOS transistors N61 to N64 included in the selection circuit 66 are connected together. Even when any of the negative high voltages VNN1 to VNN4 is selected and coupled to the input pad 7j, the MOS transistors N61 to N64 which are not selected have same voltage level at the control gate, back gate, and source, and normally maintain an OFF state. A negative high voltage can be transmitted to the input pad 7j and monitored externally.

By inverting in conductivity the MOS transistors and the voltage polarization in the level shifting circuit and the selection circuit in the configuration of FIG. 16, the selecting operation can be similarly performed with respect to the positive high voltages VPP1 to VPP4.

As described above, according to the ninth embodiment of the invention, one of a plurality of internal voltages is selected and transmitted to the input pad. A plurality of internal voltages can be therefore monitored externally via one existing input pin terminal.

Tenth Embodiment

Figure 17:
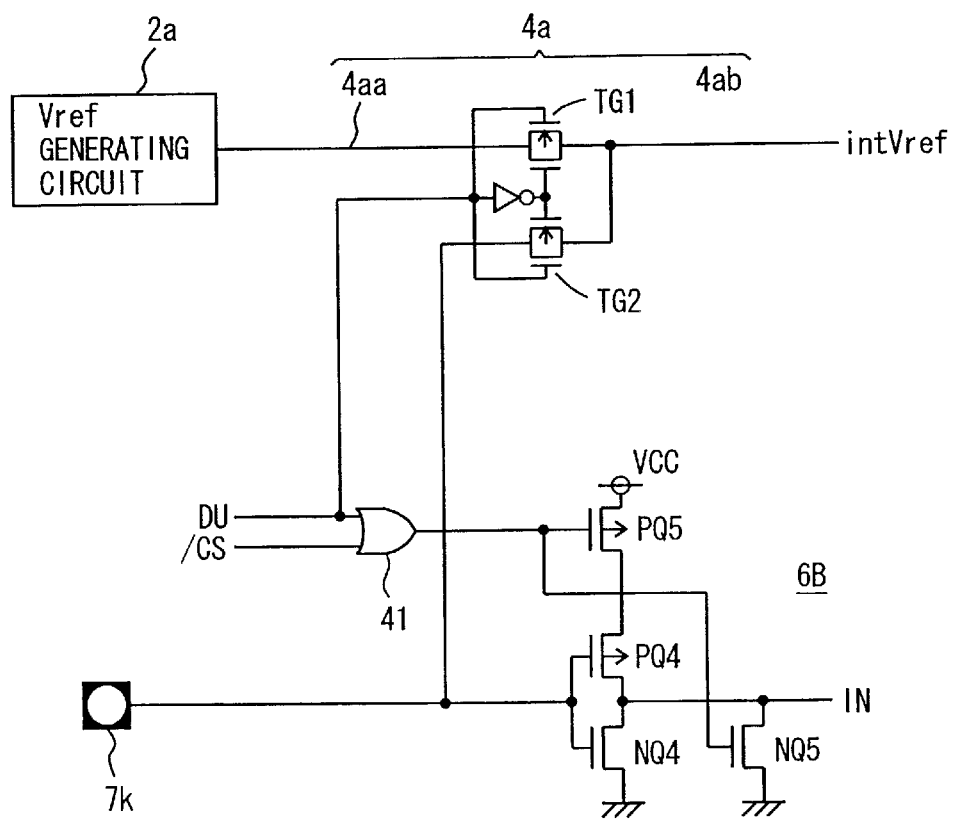
FIG. 17 is a diagram showing the configuration according to a tenth embodiment of the invention.

FIG. 17 is a diagram showing the configuration of a tenth embodiment of the invention. In FIG. 17, the reference voltage transmission line 4a for transmitting a reference voltage from the Vref generating circuit 2a that generates the reference voltage Vref is provided with: a transmission gate TG1 which is conductive, when the test mode instruction signal DU is at the L level, to transmit the reference voltage from the Vref generating circuit 2a; and a transmission gate TG2 which is conductive, when the test mode instruction signal DU is at the H level, to connect a reference voltage line 4ab for transmitting an internal reference voltage intVref to a pad 7k. When the transmission gate TG1 is nonconductive, the reference voltage transmission line 4a is divided into two reference voltage lines 4aa and 4ab. The configuration of the input buffer circuit 6B is similar to any of those shown in FIGS. 12 to 16, the corresponding parts are designated by the same reference numerals, and their detailed description is omitted here.

In the configuration shown in FIG. 17, in the test mode, the transmission gate TG1 is made nonconductive and the transmission stage TG2 is made conductive. The Vref generating circuit 2a is responsively isolated from the reference voltage line 4ab. On the other hand, the reference voltage line 4ab is connected to the input pad 7k. A voltage is applied externally to the input pad 7k, and the voltage level of the internal reference voltage intVref is forcedly set externally. The voltage level of the reference voltage intVref determines the voltage levels of the high voltages VPP and VNN that are generated internally. By commonly connecting the voltage level of the internal reference voltage intVref externally to operate an internal circuit, an operation margin of the internal circuit and others can be measured.

When the voltage externally applied to the input pad 7k is at an intermediate voltage level, the MOS transistor PQ5 is turned off in the test mode, and a through current flowing path in the input buffer circuit 6B is cut off. When the internal reference voltage intVref is set to a voltage level which is either higher than that of the power supply voltage VCC or lower than the ground voltage VSS, one of the MOS transistors PQ4 and NQ4 is turned off. Similarly, a path through which a through current flows in the input buffer circuit 6B is cut off.

By supplying a level-shifted signal of the test mode instruction signal DU to the transmission gates TG1 and TG2, the voltage levels of the negative high voltage VNN and the positive high voltage VPP can be set externally.

As described above, according to the tenth embodiment of the invention, the internal voltage can be set at a desired voltage level with the input pin terminal, and estimation of the internal circuit and an acceleration test such as a burn-in test can be carried out without increasing the number of pins.

Eleventh Embodiment

Figure 18:
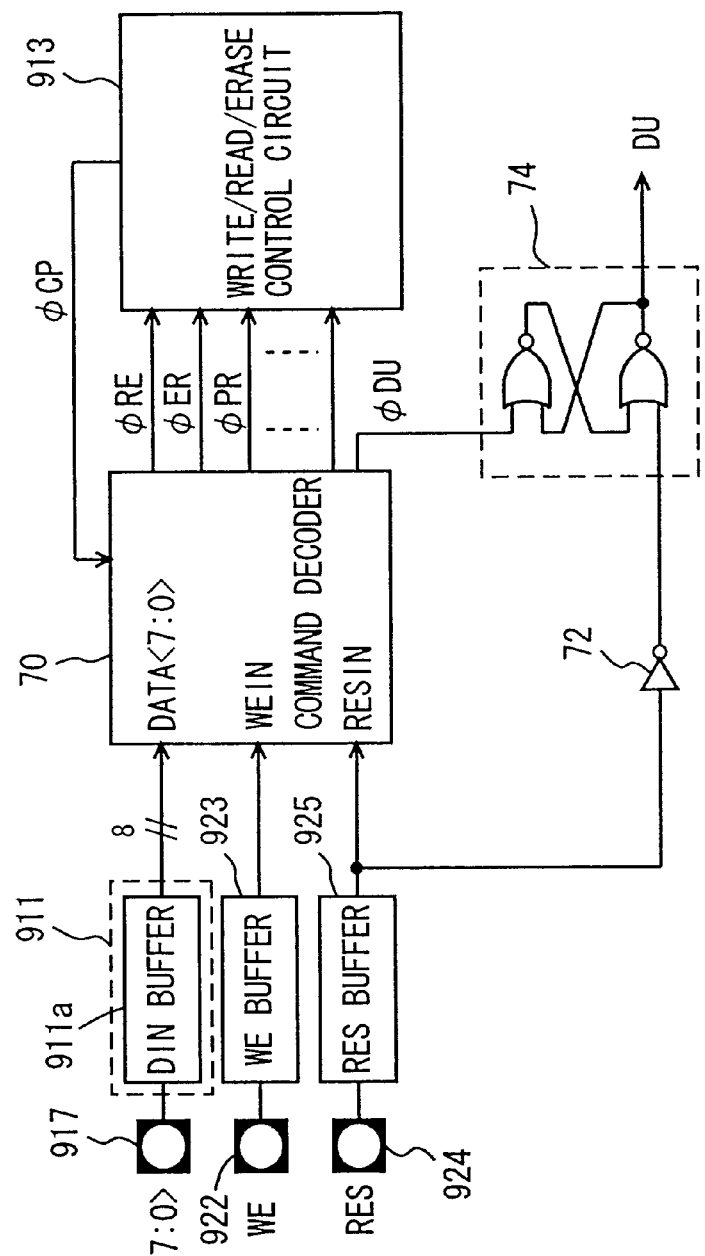
FIG. 18 is a diagram showing the configuration according to an eleventh embodiment of the invention.

FIG. 18 is a diagram schematically showing the configuration of an eleventh embodiment of the invention. In FIG. 18, the configuration of a section for generating the test mode instruction signal DU is illustrated. A command decoder 70 performs a decoding operation in accordance with signals and data received from a DIN buffer 911a, a WE buffer 923, and an RES buffer 925 and activates a test mode signal φDU. That is, a new command for externally monitoring the internal voltage or forcedly setting the internal voltage is generated. The test mode instruction signal DU is generated by a set/reset flip-flop 74 which is set in response to the activation (H level) of the test mode signal φDU and is reset in response to a system reset signal RES applied from the RES buffer 925 via an inverter. The reset signal RES is at the H level in an inactive state.

Once the command instructing the test mode is applied, the set/reset flip-flop 74 is responsively set, and the test mode instruction signal DU attains an active state of the H level. In such a state, a necessary number of commands for generating an internal voltage or internal voltages are applied externally. A command only for generating an internal voltage, but for causing no internal write/erase/read operation may be newly prepared. A read/write/erase command may be used as a command for generating an internal voltage.

Figure 19:
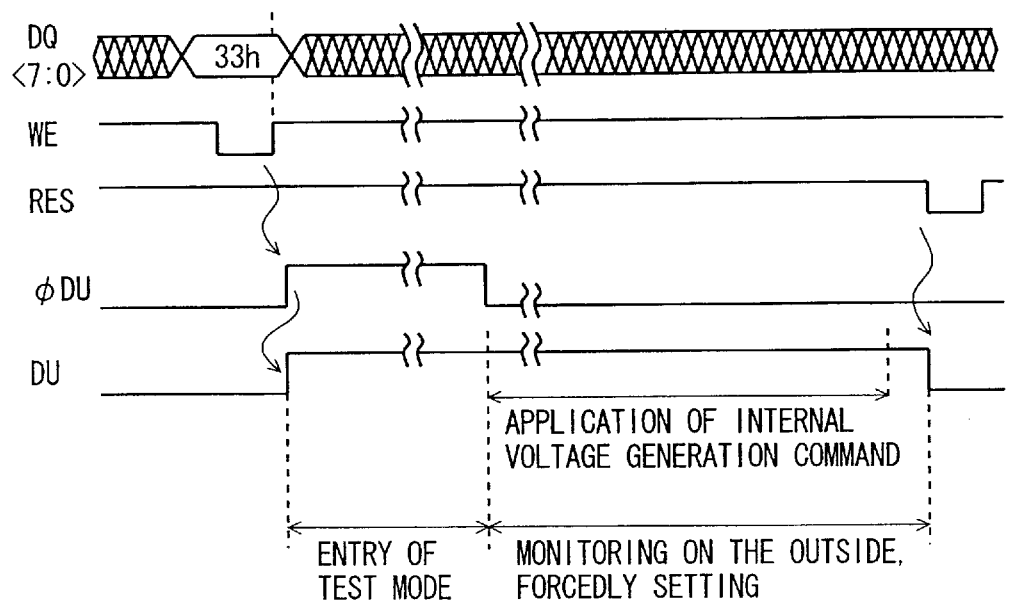
FIG. 19 is a signal waveform chart representing operations of circuits shown in FIG. 18.

In the input buffer circuit, it is necessary to receive a command and activate the chip select signal /CS. In the case of coupling a pad coupled to the input buffer circuit to the internal voltage line, it is necessary to set a pad for monitoring/forcedly setting an internal voltage as an input pad which is not used at the time of applying an internal voltage generating command. An example of such a pad is the shift clock input terminal SC (except the case of selecting one of a plurality of reference voltages and internal voltages). Alternatively, a specific address pin terminal may be used. The operation of the test mode instruction signal generating unit shown in FIG. 18 will be described with reference to the timing chart of FIG. 19.

First, a command "33h" instructing a test mode is applied to the DIN buffer 911a. The write enable signal WE is set to the L level. When the write enable signal WE rises to the H level, the command decoder 70 performs a decoding operation, detects designation of the test mode of monitoring/forcedly setting an internal voltage, and activates the test mode signal ɸDU. When the test mode signal ɸDU is made active, the set/reset flip-flop 74 is set, and the test mode instruction signal DU is made active.

After elapse of a predetermined period since completion of the operation of decoding the command, the command decoder 70 drives the test mode signal ɸDU into an inactive state. However, the set/reset flip-flop 74 maintains the set state and the test mode instruction signal DU maintains the H level, a test mode entry period is completed. Subsequently, the internal voltage generation commands are sequentially applied via the data input terminal group 917. The command decoder 70 decodes the internal voltage generation command and applies an internal voltage generation instruction signal to the write/read/erase control circuit 913. In accordance with the kind of the internal voltage generation command, the reference voltage Vref, positive high voltage VPP, or negative high voltage VNN is generated. The internal voltage generated is monitored externally or forcedly set from an outside of the memory device by any of the methods described in the foregoing first to tenth embodiments. In this case, the internal voltage generation command may be a command instructing the writing/reading/erasing operation, and the write/read/erase control circuit 913 executes a necessary operation according to the designated operation.

After completion of a necessary test on an internal voltage, the reset signal RES is set to the L level, the reset/reset flip-flop 74 is reset, and the test mode instruction signal DU is driven to the L level.

By providing the command "33h" for a test mode, a test mode can be set without requiring a new pin terminal.

Twelfth Embodiment

Figure 20:
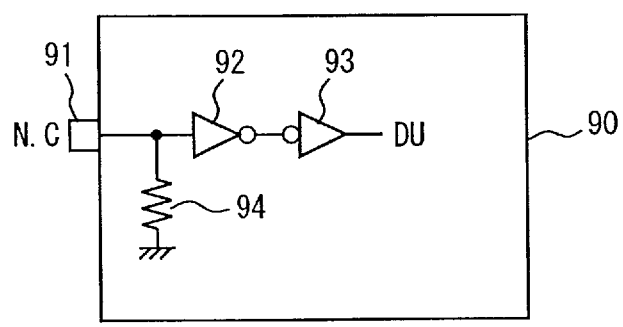
FIG. 20 is a diagram schematically showing the configuration according to a twelfth embodiment of the invention.

FIG. 20 is a diagram schematically showing the configuration of a twelfth embodiment of the invention. In the configuration shown in FIG. 20, inverters 92 and 93 of two stages are connected to an external pin terminal 91 which is set in an open state (no connection (NC) state) in a practical use. The test mode instruction signal DU is generated from the inverter 93. The input of the inverter 92 is connected to the external pin terminal 91 and a pull-down resistor 94 having a large resistance value RPULL is connected.

In the configuration of FIG. 20, in a practical use, the external pin terminal 91 is made open. In this case, the test mode instruction signal DU is held at the L level by the pull-down resistor 94. In a test after packaging, when the internal voltage is monitored or forcedly applied, the external pin terminal 91 is set to the power supply voltage VCC level. Accordingly, the test mode instruction signal DU attains the H level. In this case, although a through current flows through the pull-down resistor 94, the external pin terminal 91 is supplied with the power supply voltage VCC only in a test, and in a practical use, is kept in an open state, so that no problem occurs. By generating the test mode instruction signal DU by utilizing the external pin terminal that is not used in practice, it is unnecessary to newly add an external pin terminal and the test mode instruction signal DU can be easily made active.

Thirteenth Embodiment

Figure 21:
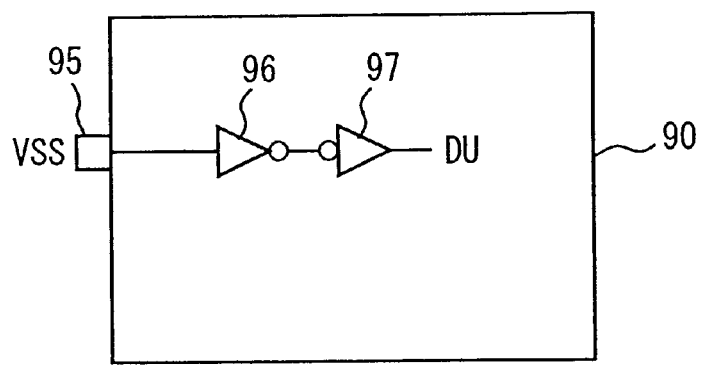
FIG. 21 is a diagram showing the configuration according to a thirteenth embodiment of the invention.

FIG. 21 is a diagram schematically showing the configuration of a thirteenth embodiment of the invention. In FIG. 21, an external pin terminal 95 of a semiconductor integrated circuit device 90 is fixed to the ground voltage VSS in a practical use. Inverters 96 and 97 of two stages are connected to the external pin terminal 95. The test mode instruction signal DU is generated from the inverter 97 at the output stage. With the configuration, for example, in the case of fixing the external pin terminal 95 to the ground voltage VSS in a practical use, the external pin terminal 95 is connected to, for examples a shielding wire. In a test of an internal voltage, the power supply voltage VCC is applied to the external pin terminal 95. Accordingly, the test mode instruction signal DU attains the H level and a test on an internal voltage can be performed. Even when a pin terminal used for a shielding wire for canceling noises internally, or the like, is fixed to the power supply voltage VCC level in a test mode, the shielding effect does not deteriorate. Without causing an erroneous operation in the internal circuit, the test mode instruction signal DU can be easily generated without providing an additional pin terminal.

Fourteenth Embodiment

Figure 22:
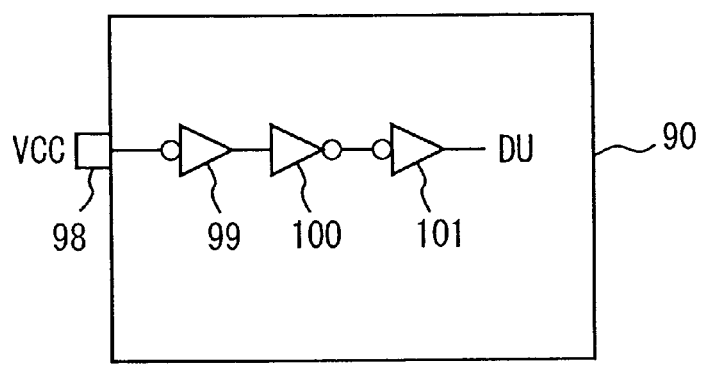
FIG. 22 is a diagram showing the configuration according to a fourteenth embodiment of the invention.

FIG. 22 is a diagram schematically showing the configuration of a fourteenth embodiment of the invention. In FIG. 22, an external pin terminal 98 of the semiconductor integrated circuit device 90 is fixed at the power supply voltage VCC level in a normal practical use. Inverters 99 to 101 of odd-number stages (three stages) are connected in series to the external pin terminal 98. The test mode instruction signal DU is generated from the inverter 101 at the final stage. The external pin terminal 98 is connected to, for example, a shielding wire internally. In a test on an internal voltage, the external pin terminal 98 is set at the ground voltage VSS. The test mode instruction signal DU can be accordingly set to the H level. In the case of a shielding wire, even when it is set at the power supply voltage VCC level in a normal mode and is set at the ground voltage VSS level in a test on the internal voltage, the voltage level of the shielding wire is fixed and no adverse influence is exerted on the shielding effect.

In the fourth embodiment of the invention as well, without newly adding a pin terminal, the test mode instruction signal can be applied.

In the first embodiment and others, as an example of the output buffer circuit, the data output buffer circuit which operates in response to the output enable signal /OE is described. In the case of a nonvolatile semiconductor memory device, however, a pin terminal for externally outputting a ready/busy signal instructing a waiting of an access when the writing or erasing operation is performed internally is provided. As an output buffer circuit, therefore, an output buffer circuit which outputs a ready/busy signal may be employed.

As an example of a semiconductor integrated circuit, a nonvolatile semiconductor memory device is described. The present invention can be also applied to a memory such as a dynamic random access memory (DRAM), in which a plurality of voltages, such as a high voltage VPP applied to a selected word line, a negative bias voltage VNN applied to the substrate region, and the reference voltage Vref at an intermediate voltage level used for, for example, precharging a bit line are generated.

The semiconductor integrated circuit is not generally limited to a memory. However, the invention can be applied to a semiconductor circuit device including a circuit in which an internal voltage different in voltage level from a power supply voltage and a ground voltage, which are externally applied, is generated.

As described above, according to the invention, a voltage generated internally is coupled to a pad connected to an external pin terminal and a corresponding buffer circuit is made inactive. Therefore, it is unnecessary to newly provide a pin terminal, the internal voltage can be monitored or forcedly applied from an outside of the device of interest, and an internal circuit can be measured and estimated even after packaging. When a failure occurs after packaging, the cause of a failure can be efficiently analyzed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor integrated circuit receiving a first power supply voltage and a second power supply voltage externally applied for operation, comprising:

an internal voltage generating circuit for generating at least one internal voltage different in voltage level from the first and second power supply voltages;

a buffer circuit coupled to a pad; and a switching circuit for inactivating said buffer circuit and coupling said internal voltage generating circuit to said pad in response to a control signal.

2. The semiconductor integrated circuit according to claim 1, wherein said buffer circuit is an output buffer circuit for buffering an internal signal for outputting to said pad when activated, and including first and second insulated gate field effect transistors made conductive complementarily in accordance with said internal signal, and said switching circuit includes:
a gate circuit for making the first and second insulated gate field effect transistors nonconductive in response to said control signal; and
a transfer gate for transmitting the internal voltage generated by said internal voltage generating circuit to said pad in response to said control signal.

3. The semiconductor integrated circuit according to claim 2, wherein said at least one internal voltage includes an internal voltage at a voltage level between levels of the first and second power supply voltages, and said transfer gate is a P-channel field effect transistor.

4. The semiconductor integrated circuit according to claim 1, wherein said buffer circuit includes first and second insulated gate field effect transistors of different conductivity type from each other, and said at least one internal voltage includes an internal voltage greater in an absolute value than the first power supply voltage, and said switching circuit includes:
a level shifting circuit for shifting a voltage level of said control signal and generating a resultant signal;
a control transistor of a same conductive type as the first insulated gate field transistor, connected between the first insulated gate field effect transistor and a power supply node receiving the first power supply voltage and made nonconductive in response to said resultant signal; and
a transfer gate made conductive complementarily with said control transistor in response to the resultant signal of the level shifting circuit and transmitting said internal voltage from said internal voltage generating circuit to said pad.

5. The semiconductor integrated circuit according to claim 4, wherein said internal voltage is a positive high voltage, and said transfer gate is a P-channel field effect transistor having a back gate and a source coupled together to receive said internal voltage.

6. The semiconductor integrated circuit according to claim 4, wherein said internal voltage is a negative voltage, the first power supply voltage is a ground voltage, and said transfer gate is an N-channel field effect transistor having a back gate and a source coupled together to receive said internal voltage.

7. The semiconductor integrated circuit according to claim 1, wherein said internal voltage generating circuit generates a plurality of internal voltages as said at least one internal voltage, and said switching circuit includes:
a selection signal generating circuit made active in response to said control signal and generating selection signals for sequentially selecting said plurality of internal voltages when made active; and
a selection gate for sequentially selecting said plurality of internal voltages in response to the selection signals from said selection signal generating circuit and transmitting a selected internal voltage to said pad.

8. The semiconductor integrated circuit according to claim 7, further comprising:

a memory array having a plurality of memory cells;

a data register for receiving and holding storage data of a plurality of memory cells selected in said memory array; and a counting circuit for performing a counting operation in response to a clock signal and generating a count signal for sequentially selecting data held in said data register, wherein said selection signal generating circuit performs a counting operation in response to said clock signal and sequentially activates said selection signals when made active.

9. The semiconductor integrated circuit according to claim 7, further comprising:

a memory array having a plurality of memory cells;

a data register for receiving and holding storage data of a plurality of memory cells selected in said memory array; and a counting circuit for performing a counting operation in response to a clock signal and generating a multi-bit count signal for sequentially selecting data held in said data register, wherein said selection signal generating circuit has a decoding circuit for decoding a predetermined bit of said multi-bit count signal from said counting circuit and generating said selection signals.

10. The semiconductor integrated circuit according to claim 1, wherein said buffer circuit is an input buffer circuit for buffering a signal applied to said pad and generating an internal signal when made active, said input buffer circuit comprises: first and second insulated gate field effect transistors made conductive complementarily in response to a signal applied to said pad; and a third field effect transistor connected between the first field effect transistor and a first power supply node, and said switching circuit includes:
a gate circuit for setting the third field effect transistor into a nonconductive state in response to said control signal; and
a transfer gate for transmitting the internal voltage from said internal voltage generating circuit to said pad in response to said control signal.

11. The semiconductor integrated circuit according to claim 10, wherein said gate circuit sets the third field effect transistor into a nonconductive state in response to a chip selection instructing signal instructing selection of said semiconductor integrated circuit.

12. The semiconductor integrated circuit according to claim 10, further comprising a level shifting circuit for converting said control signal into a signal having an amplitude of the internal voltage level and supplying a resultant signal to said transfer gate.

13. The semiconductor integrated circuit according to claim 10, wherein said input buffer further comprises a fourth field effect transistor made conductive complementarily with the third field effect transistor in response to an output signal of said gate circuit and connecting an output node of said input buffer to a second power supply node when made conductive.

14. The semiconductor integrated circuit according to claim 1, further comprising:
   a command decoder for decoding a plurality of signals externally applied and generating an operation mode instruction signal; and
   a latch circuit for generating said control signal in accordance with said operation mode instruction signal from said command decoder.

15. The semiconductor integrated circuit according to claim 1, further comprising:
   a control signal generating circuit coupled to a specific pin terminal and generating said control signal in accordance with a voltage of said specific pin terminal.

16. The semiconductor integrated circuit according to claim 15, wherein said specific pin terminal is fixed at a predetermined voltage level in a practical use.

17. The semiconductor integrated circuit according to claim 15, wherein said specific pin terminal is in an open state in a practical use.

18. The semiconductor integrated circuit according to claim 1, wherein said control signal is generated by inverting a logic level of a voltage in a practical use of a specific pin terminal.

19. A semiconductor integrated circuit receiving first and second power supply voltages externally applied for operation, comprising:
   an internal voltage generating circuit for generating at least one internal voltage different in voltage level from the first and second power supply voltages;
   an internal voltage transmission line for transmitting the internal voltage;
   a switching circuit for isolating said internal voltage transmission line and said internal voltage generating circuit from each other in accordance with a control signal and connecting said internal voltage transmission line to a pad; and
   a buffer circuit coupled to said pad and made inactive in response to said control signal and having an output signal fixed to a voltage of a predetermined logic level when made inactive.

20. The semiconductor integrated circuit according to claim 19, further comprising:
   a command decoder for decoding a plurality of signals externally applied and generating an operation mode instruction signal in accordance with a result of decoding; and
   a latch circuit for generating said control signal in accordance with said operation mode instruction signal from said command decoder.

21. The semiconductor integrated circuit according to claim 19, further comprising:
   a control signal generating circuit coupled to a specific pin terminal and generating said control signal in accordance with a voltage of said pin terminal.

22. The semiconductor integrated circuit according to claim 21, wherein said specific pin terminal is fixed at a predetermined voltage level in a practical use.

23. The semiconductor integrated circuit according to claim 21, wherein said specific pin terminal is in an open state in a practical use.

24. The semiconductor integrated circuit according to claim 19, wherein said control signal is generated by inverting a logic level of a voltage in a practical use of said specific pin terminal.

25. The semiconductor integrated circuit according to claim 19, wherein said buffer circuit is an input buffer for buffering a signal applied to said pad to generate an internal signal.

26. The semiconductor integrated circuit according to claim 19, wherein said buffer circuit is an input buffer for generating an internal circuit operation enabling signal and the output signal fixed to the voltage of the predetermined logic level enables an internal circuit operation of said semiconductor integrated circuit.

* * * * *

UNITED STATES PATENT AND TRADEMARK OFFICE
CERTIFICATE OF CORRECTION

PATENT NO. : 6,549,480 B2
DATED : April 15, 2003
INVENTOR(S) : Akira Hosogane et al.

It is certified that error appears in the above-identified patent and that said Letters Patent is hereby corrected as shown below:

<u>Column 32,</u>
Line 32, change "said" to -- a --

Signed and Sealed this

Seventh Day of October, 2003

JAMES E. ROGAN
*Director of the United States Patent and Trademark Office*